(12) United States Patent
Urban et al.

(10) Patent No.: US 10,669,869 B1
(45) Date of Patent: Jun. 2, 2020

(54) INDEPENDENTLY ROTATABLE PROPELLER BLADE MOUNTS

(71) Applicant: Amazon Technologies, Inc., Seattle, WA (US)

(72) Inventors: Bradley David Urban, Bainbridge Island, WA (US); Dominic Timothy Shiosaki, Seattle, WA (US); Ricky Dean Welsh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 342 days.

(21) Appl. No.: 15/600,252

(22) Filed: May 19, 2017

(51) Int. Cl.
| | |
|---|---|
| *B64C 27/08* | (2006.01) |
| *F01D 7/02* | (2006.01) |
| *B64C 11/28* | (2006.01) |
| *F01D 5/00* | (2006.01) |
| *B64C 39/02* | (2006.01) |

(52) U.S. Cl.
CPC ............... *F01D 7/02* (2013.01); *B64C 11/28* (2013.01); *F01D 5/00* (2013.01); *B64C 39/024* (2013.01); *B64C 2201/027* (2013.01); *B64C 2201/108* (2013.01); *B64C 2201/127* (2013.01)

(58) Field of Classification Search
CPC ... F01D 7/02; F01D 5/00; B64C 11/28; B64C 2201/027; B64C 2201/108; B64C 2201/127; B64C 39/024
USPC .................. 416/131, 142, 143, 10, 392, 104
See application file for complete search history.

(56) References Cited

U.S. PATENT DOCUMENTS

| | | | |
|---|---|---|---|
| 2,369,276 A | | 2/1945 | Cameron et al. |
| 3,750,981 A | | 8/1973 | Prather |
| 3,811,642 A | | 5/1974 | Prather |
| 3,838,835 A | * | 10/1974 | Kling ..................... B64C 27/20 |
| | | | 244/23 C |
| 5,364,230 A | * | 11/1994 | Krauss ................... B64C 27/20 |
| | | | 416/134 A |
| 9,409,642 B1 | | 8/2016 | Pingree |
| D818,874 S | * | 5/2018 | Tian .......................... D12/16.1 |
| 9,975,631 B1 | | 5/2018 | McLaren et al. |
| 10,137,982 B1 | | 11/2018 | Dormiani et al. |
| 2014/0091172 A1 | | 4/2014 | Arlton et al. |
| 2016/0001879 A1 | | 1/2016 | Johannesson et al. |
| 2016/0179096 A1 | | 6/2016 | Bradlow et al. |

(Continued)

FOREIGN PATENT DOCUMENTS

| | | |
|---|---|---|
| WO | 2014160526 A3 | 2/2015 |
| WO | 2016192021 A1 | 12/2016 |

*Primary Examiner* — Hai H Huynh
*Assistant Examiner* — Gonzalo Laguarda
(74) *Attorney, Agent, or Firm* — Athorus, PLLC

(57) ABSTRACT

Aerial vehicles may be equipped with propellers having pivotable blades that are configured to rotate or fold when the propellers are not rotating under power. A pivotable blade may rotate about an axis of a propeller with respect to a hub in the presence of wind flow until the pivotable blade is coaligned with a fixed blade, in a direction opposite to the wind flow. A pivotable blade may also fold over a hub of a propeller in the presence of wind flow, with the pivotable blade and a fixed blade being oriented in directions opposite to the wind flow. A center of mass of the pivotable blade may be caused to be on the same side of an axis as a center of mass of a fixed blade, even where the axis is not normal to the wind flow, thereby reducing an amount of drag generated by the propeller.

21 Claims, 19 Drawing Sheets

BLADE 132-3 SWINGS AROUND
TO ALIGN WITH BLADE 134-3 IN PRESENCE OF WIND FLOW

(56) References Cited

U.S. PATENT DOCUMENTS

| | | |
|---|---|---|
| 2016/0229531 A1 | 8/2016 | Robertson et al. |
| 2017/0029106 A1* | 2/2017 | Chang ................... B64C 13/042 |
| 2017/0197702 A1 | 7/2017 | Alley et al. |
| 2017/0283050 A1* | 10/2017 | Baek ....................... B64C 27/08 |
| 2017/0297678 A1 | 10/2017 | Baskin et al. |
| 2017/0320565 A1 | 11/2017 | Gamble et al. |
| 2018/0079500 A1 | 3/2018 | Foskey |
| 2018/0093753 A1 | 4/2018 | Chow |
| 2018/0186445 A1 | 7/2018 | Fenny et al. |
| 2018/0257769 A1 | 9/2018 | Goldstein |

* cited by examiner

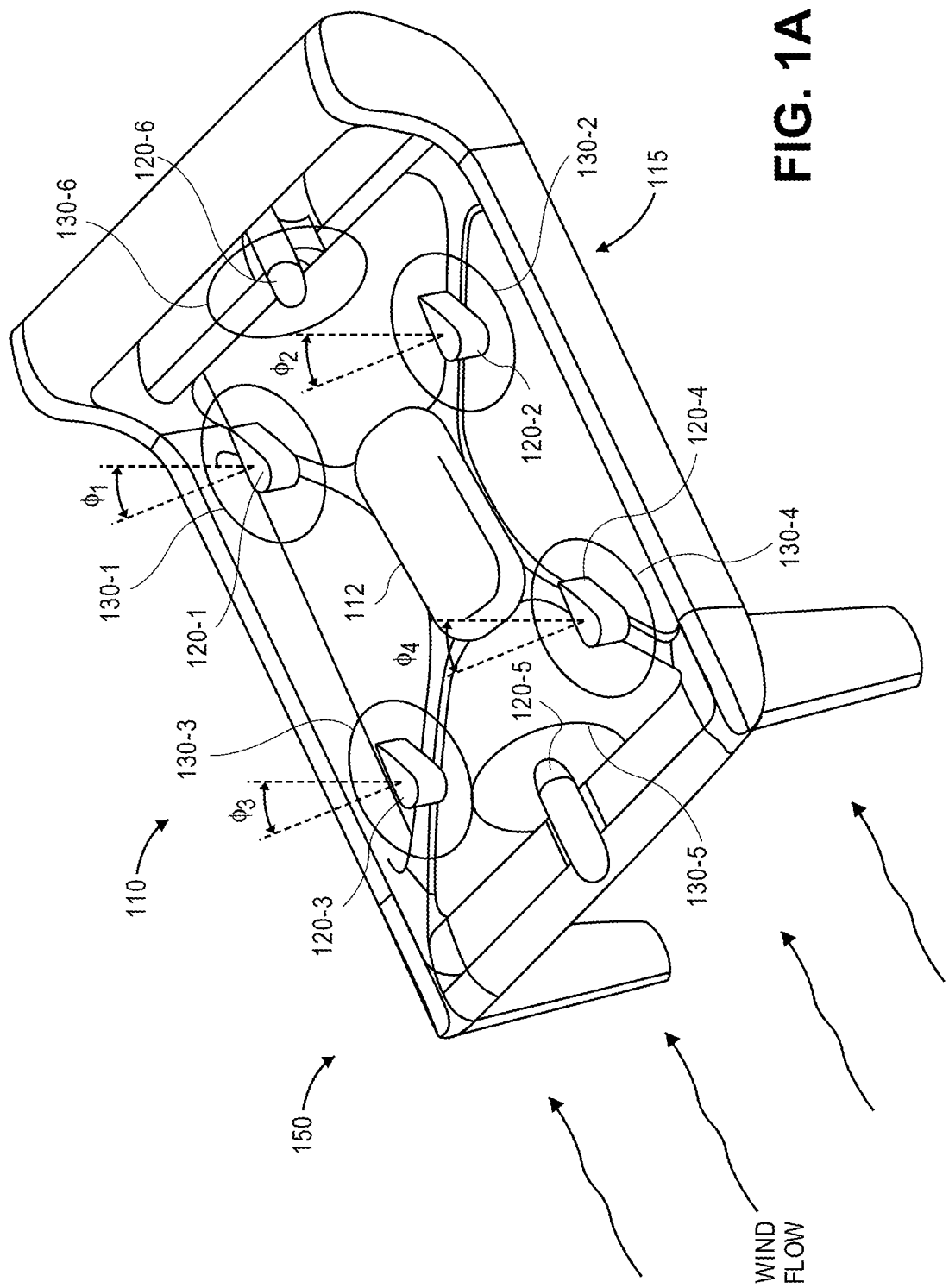

INDEPENDENTLY ROTATABLE PROPELLER BLADE MOUNTS

BACKGROUND

Many unmanned aerial vehicles include multiple motors, each having one or more propellers for generating forces in a given direction, typically in a direction corresponding to an axis of the motor, about which the propeller rotates. Many unmanned aerial vehicles feature two, four, eight or other numbers of motors and propellers to provide forces of lift and/or thrust in any number of directions. The motors and propellers may be operated independently or in concert with one another, on an as-needed or an as-desired basis. For example, because the availability of excess lift is most essential during take-off and landing (or vertical) evolutions of an unmanned aerial vehicle, multi-rotor unmanned aerial vehicles are commonly equipped with greater lift capacity than is commonly required during most transiting (or forward) operations, in order to ensure that excess lift is available when needed, primarily during take-offs or landings.

In order to conserve onboard electrical power when force is neither desired nor required from each of the motors provided aboard an unmanned aerial vehicle, one or more of the motors may be shut down from time to time, such as when the unmanned aerial vehicle is transiting, or operating in a thrust mode, or other modes in which force in a direction of a motor axis is not required. One or more of the motors may be restarted when the unmanned aerial vehicle prepares to land at a given location, or otherwise requires force in a direction of a motor axis.

A propeller that is at rest on an in-flight unmanned aerial vehicle may create undesirable drag and restrict the stability of the unmanned aerial vehicle during transiting operations. Where a propeller at rest is aligned normal to a direction of wind flow, the propeller may naturally align in a direction parallel to that of the wind flow, or be urged into that direction, thereby reducing the extent of drag created by the propeller. Where a propeller at rest is not aligned normal to the direction of wind flow, however, drag created by the propeller may be substantial.

BRIEF DESCRIPTION OF THE DRAWINGS

FIGS. 1A through 1E are views of an unmanned aerial vehicle having a plurality of propellers in accordance with embodiments of the present disclosure.

DETAILED DESCRIPTION

Figure 1B:
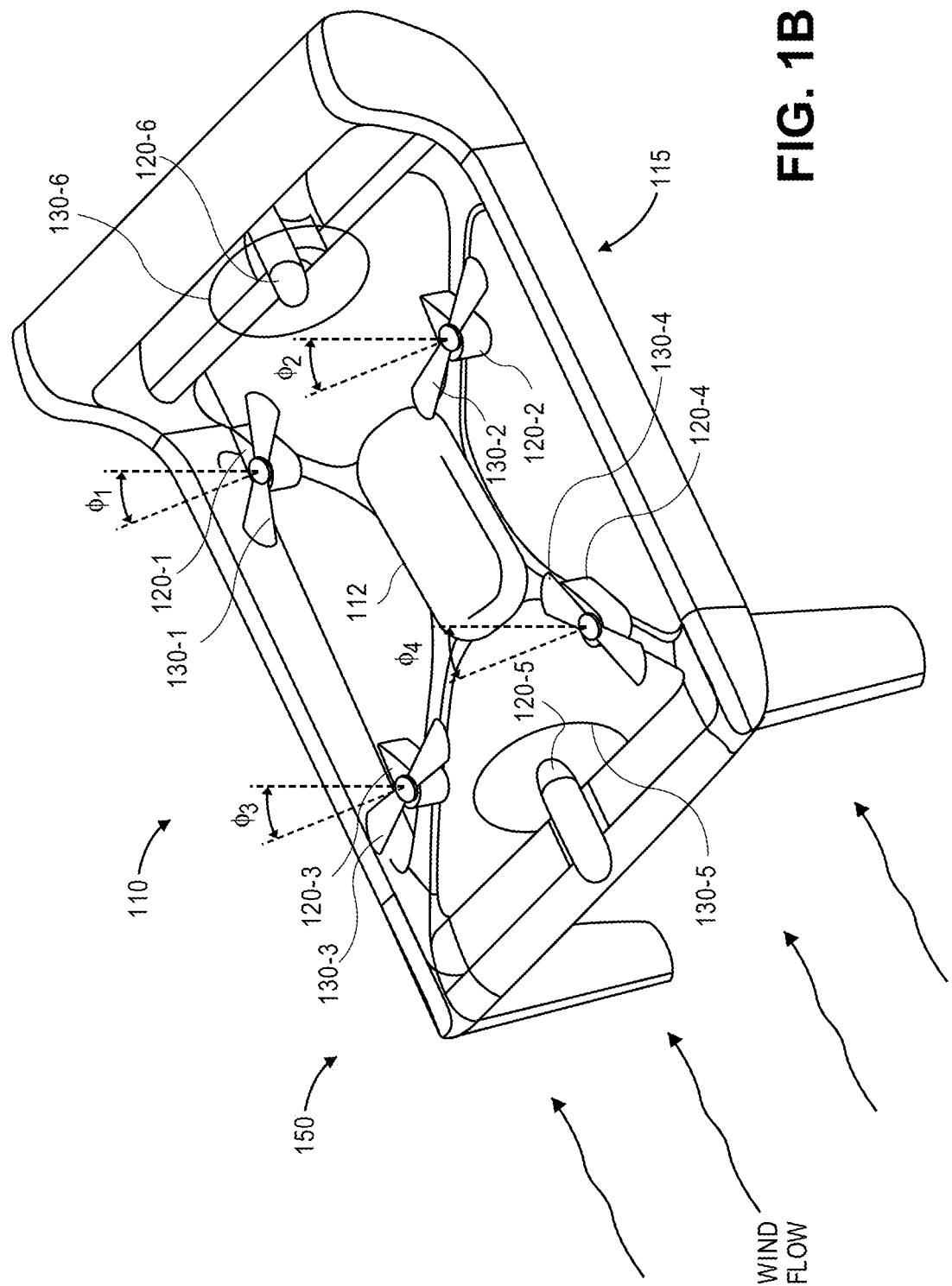

As is set forth in greater detail below, the present disclosure is directed to propulsion units having motors and propellers. The propellers include one or more blades that are mounted to hubs in a manner that enables the blades to fold or pivot independent of the hub when the propellers are not rotating, and when the propellers are in the presence of wind flow, even when the propeller axes are not aligned normal (or perpendicular) to a direction of the wind flow, such as when the propellers are not aligned vertically or perpendicular to a forward orientation of the aerial vehicle. The folding or pivoting of the blades may cause centers of mass of each of the blades of a propeller of an aerial vehicle to reside on a common side of an axis of rotation of the propeller. When the propeller begins to rotate, centrifugal forces may cause a folded or pivoted blade to return to an opposite (or antipodal) side of a hub from a fixed blade, or to a normal operating position with respect to the hub. Alternatively, a propeller may include an operator that urges a folded or pivoted blade to the opposite (or antipodal) side of the hub, e.g., to an opposite side of an axis of rotation of the propeller, or to a normal operating position with respect to the hub, prior to or shortly after resuming operation.

Referring to FIGS. 1A through 1E, an aerial vehicle 110 having a plurality of propellers in accordance with embodiments of the present disclosure is shown. The aerial vehicle 110 includes a control system 112 and a frame 115 having a plurality of motors 120-1, 120-2, 120-3, 120-4, 120-5, 120-6 mounted thereto. The frame 115 includes a plurality of control surfaces and/or other structural components of the aerial vehicle 110. Each of the plurality of motors 120-1, 120-2, 120-3, 120-4, 120-5, 120-6 is mounted to the frame 115 and forms a propulsion unit with one of a plurality of propellers (or rotors) 130-1, 130-2, 130-3, 130-4, 130-5, 130-6 that is rotatably coupled thereto.

The control system 112 is mounted in association with the frame 115 and may include one or more processors, computer devices, memory components and/or transceivers, as necessary. The control system 112 may operate one or more electronic speed controls, power supplies, navigation systems and/or payload engagement controllers for controlling the operation of the aerial vehicle 110, e.g., by one or more control signals. For example, the control system 112 may be configured to cause or control the operation of one or more of the motors 120-1, 120-2, 120-3, 120-4, 120-5, 120-6 or the propellers 130-1, 130-2, 130-3, 130-4, 130-5, 130-6, such as to cause one or more of the motors 120-1, 120-2, 120-3, 120-4, 120-5, 120-6 to rotate the propellers 130-1, 130-2, 130-3, 130-4, 130-5, 130-6 at a desired speed, in order to guide the aerial vehicle 110 along a determined or desired flight path. The control system 112 may further control any aspects of the aerial vehicle 110, including but not limited to one or more control surfaces such as wings, rudders, ailerons, elevators, flaps, brakes, slats or other features of the aerial vehicle 110 within desired ranges.

The motors 120-1, 120-2, 120-3, 120-4, 120-5, 120-6 may be any type of motor (e.g., an electric, gasoline-powered or any other type of motor) capable of generating sufficient rotational speeds of the corresponding propellers 130-1, 130-2, 130-3, 130-4, 130-5, 130-6, to provide lift and/or thrust forces to the aerial vehicle 110 and any engaged payload. For example, in some embodiments, one or more of the motors 120-1, 120-2, 120-3, 120-4, 120-5, 120-6 may include a brushless direct current (DC) motor such as an outrunner brushless motor or an inrunner brushless motor.

The motors 120-1, 120-2, 120-3, 120-4 are configured to rotate the propellers 130-1, 130-2, 130-3, 130-4 about axes that are aligned at angles $\phi_1$, $\phi_2$, $\phi_3$, $\phi_4$, that with respect to normal to a direction of wind flow. The motors 120-5, 120-6 are aligned to rotate the propellers 130-5, 130-6 about axes that are parallel to the direction of wind flow, e.g., in a forward or aft direction, or parallel to a forward orientation of the aerial vehicle 110.

As is shown in FIG. 1A, the aerial vehicle 110 is engaged in flight operations with each of the motors 120-1, 120-2, 120-3, 120-4, 120-5, 120-6 rotating each of the propellers 130-1, 130-2, 130-3, 130-4, 130-5, 130-6 about their respective axes of rotation, viz., angles $\phi_1$, $\phi_2$, $\phi_3$, $\phi_4$ for propellers 130-1, 130-2, 130-3, 130-4 and parallel to the direction of wind flow for the propellers 130-5, 130-6. As is shown in FIG. 1B, the motors 120-5, 120-6 remain in operation, e.g., with the aerial vehicle 110 engaged in forward flight, while the motors 120-1, 120-2, 120-3, 120-4 have been stopped.

In accordance with some embodiments of the present disclosure, propellers may include blades that are fixed in their position about axes of hubs to which the blades are mounted, as well as blades that are pivotable (or foldable or rotatable) with respect to their positions about the axes of the hubs. For example, when a propeller is not rotating, a pivotable blade of the propeller may be configured to pivot (or rotate or swing) with respect to an axis of rotation of the propeller, and be repositioned substantially in coalignment with a blade of the propeller that is not so configured, e.g., is fixed in its position about the axis of rotation, such that centers of mass of each of the blades are on a common side of the axis of rotation of the propeller. Alternatively, a pivotable blade of a propeller may be configured to fold over a hub of the propeller, and to coalign with one or more other blades, such that centers of mass of each of the blades are on a common side of an axis of rotation of the propeller.

Figure 1C:
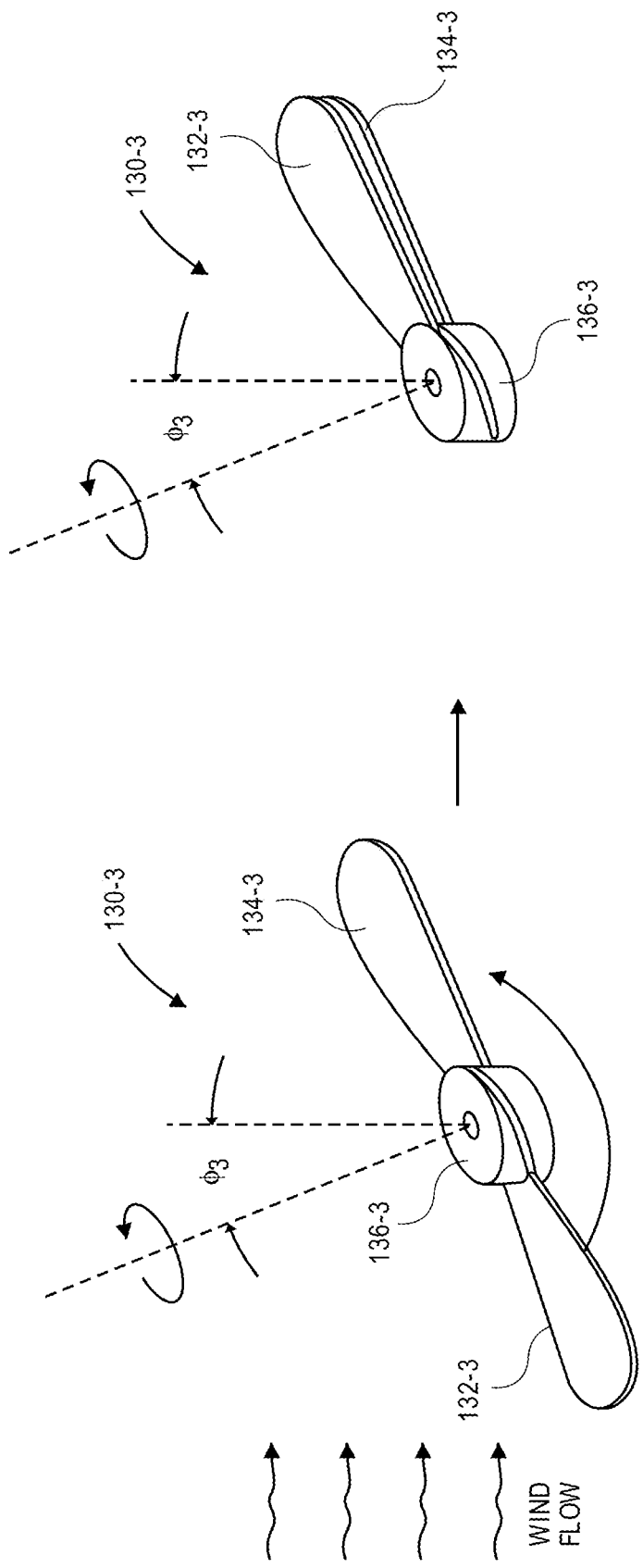

As is shown in FIG. 1C, the propeller 130-3 includes a first blade 132-3 and a second blade 134-3 mounted to a hub 136-3. The first blade 132-3 is configured to pivot or rotate independently with respect to the hub 136-3, about the axis of rotation of the propeller 130-3, when the motor 120-3 is not operating. The first blade 132-3 may include a root or other feature that is configured to slide, translate or otherwise travel freely within a track or slot (e.g., a slotted guide track) extending from one side or point on the hub (e.g., from one perimetric position on the hub) to an antipodal side or point of the hub (e.g., to another perimetric position on the hub) where the second blade 134-3 is fixedly mounted to the hub. For example, the track or slot and/or a root inserted therein may include one or more bearings or other features for reducing friction between the track or slot and the root, and ends of the track or slot may be angled or sloped and may be provided at different axial heights on the hub. The propeller 130-4 shown in FIGS. 1A and 1B may be configured to operate in the same manner as the propeller 130-3, as is shown in FIG. 1C.

Thus, when the propeller 130-3 is caused to rotate by the motor 120-3, centrifugal forces urge the first blade 132-3 into a normal operating position about the hub, e.g., at one end of the track or slot, diametrically opposite the second blade 134-3. Wind flowing over each of the first blade 132-3 and the second blade 134-3 as the propeller 130-3 rotates about an axis (e.g., an axis of a shaft of the motor 120-3) generates forces in a direction of the axis. When the motor 120-3 is stopped, however, the second blade 134-3 will align with a radial orientation that is parallel to and opposite the wind flow. With the second blade 134-3 in this radial orientation, and in the absence of a torque from the motor 120-3, the first blade 132-3 is permitted to slide, translate or otherwise travel within the track or slot to the antipodal side or point of the hub, where the first blade 132-3 coaligns with the second blade 134-3, parallel to and opposite the wind flow at a slightly different axial height on the hub defined by an end of the track or slot. As is shown in FIG. 1C, when the first blade 132-3 is coaligned with the second blade 134-3, the roots or other features by which the respective blades are joined to the hub are aligned within a common plane with the axis of rotation of the propeller 130-3.

Figure 1D:
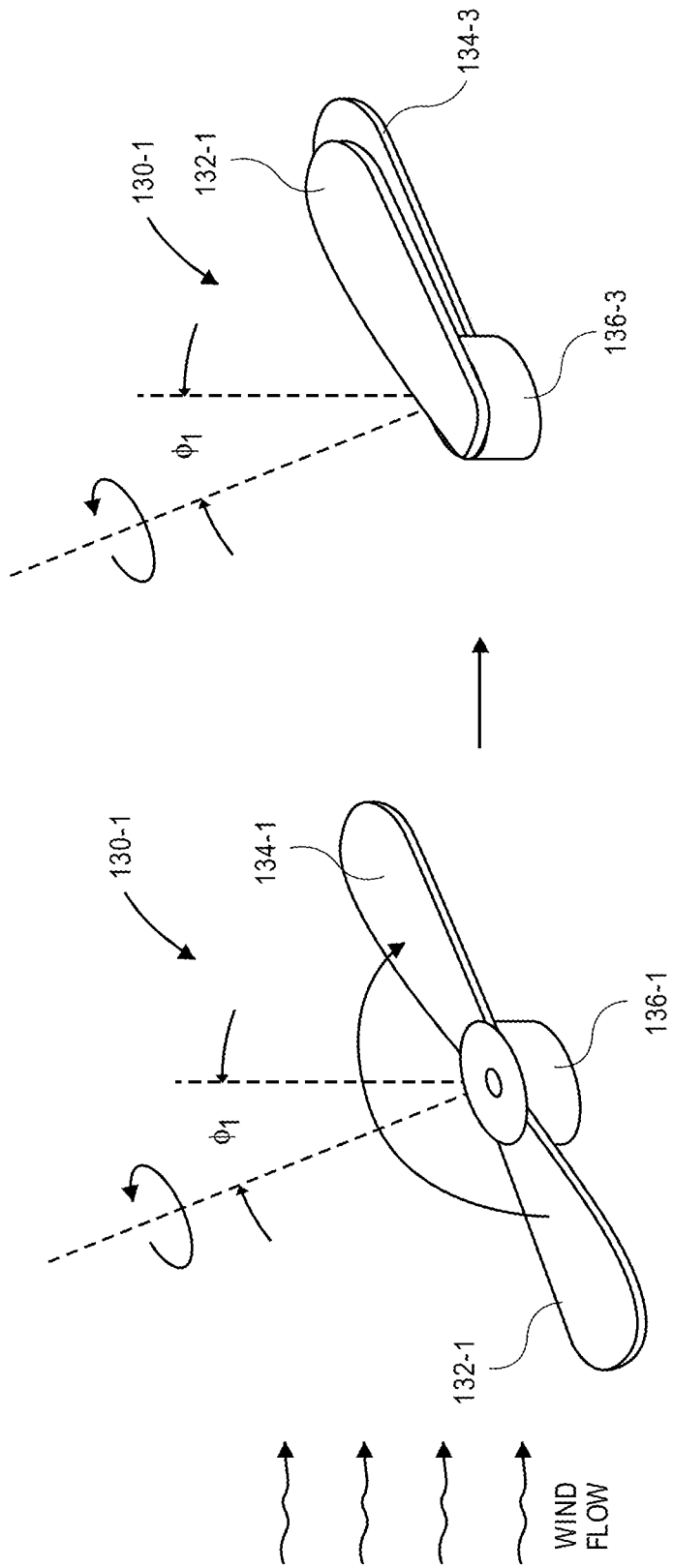

As is shown in FIG. 1D, the propeller 130-1 includes a first blade 132-1 and a second blade 134-1 mounted to a hub 136-1. The first blade 132-1 is configured to rotate about an axis that is tangential to the hub 136-1, or substantially parallel to a tangent of the hub 136-1. and perpendicular to the axis of rotation of the propeller 130-1, when the motor 120-1 is not operating. The first blade 132-1 may include a root or other feature having a hinge to which the blade 132-1 is joined, with the hinge defining an axis. Thus, when the propeller 130-1 is caused to rotate by the motor 120-1, centrifugal forces urge the first blade 132-1 into a normal operating position about the hub, e.g., with the first blade 132-1 extending radially outward, perpendicular to the axis of rotation of the propeller 130-1, diametrically opposite the second blade 134-1. Wind flowing over each of the first blade 132-1 and the second blade 134-1 as the propeller 130-1 rotates about an axis (e.g., an axis of a shaft of the motor 120-1) generates forces in a direction of the axis. When the motor 120-1 is stopped, however, the second blade 134-1 will align with a radial orientation that is parallel to and opposite the wind flow. With the second blade 134-1 in this radial orientation, and in the absence of a torque from the motor 120-1, the first blade 132-1 is permitted to fold or otherwise rotate about the hinge over the hub, and to point in a common radial orientation with the second blade 134-1, parallel to and opposite the wind flow. As is shown in FIG. 1D, when the first blade 132-1 is coaligned with the second blade 134-1, the roots or other features by which the respective blades are joined to the hub are aligned in a common plane with the axis of rotation of the propeller 130-1. The propeller 130-2 shown in FIGS. 1A and 1B may be configured to operate in the same manner as the propeller 130-1, as is shown in FIG. 1D.

Figure 1E:
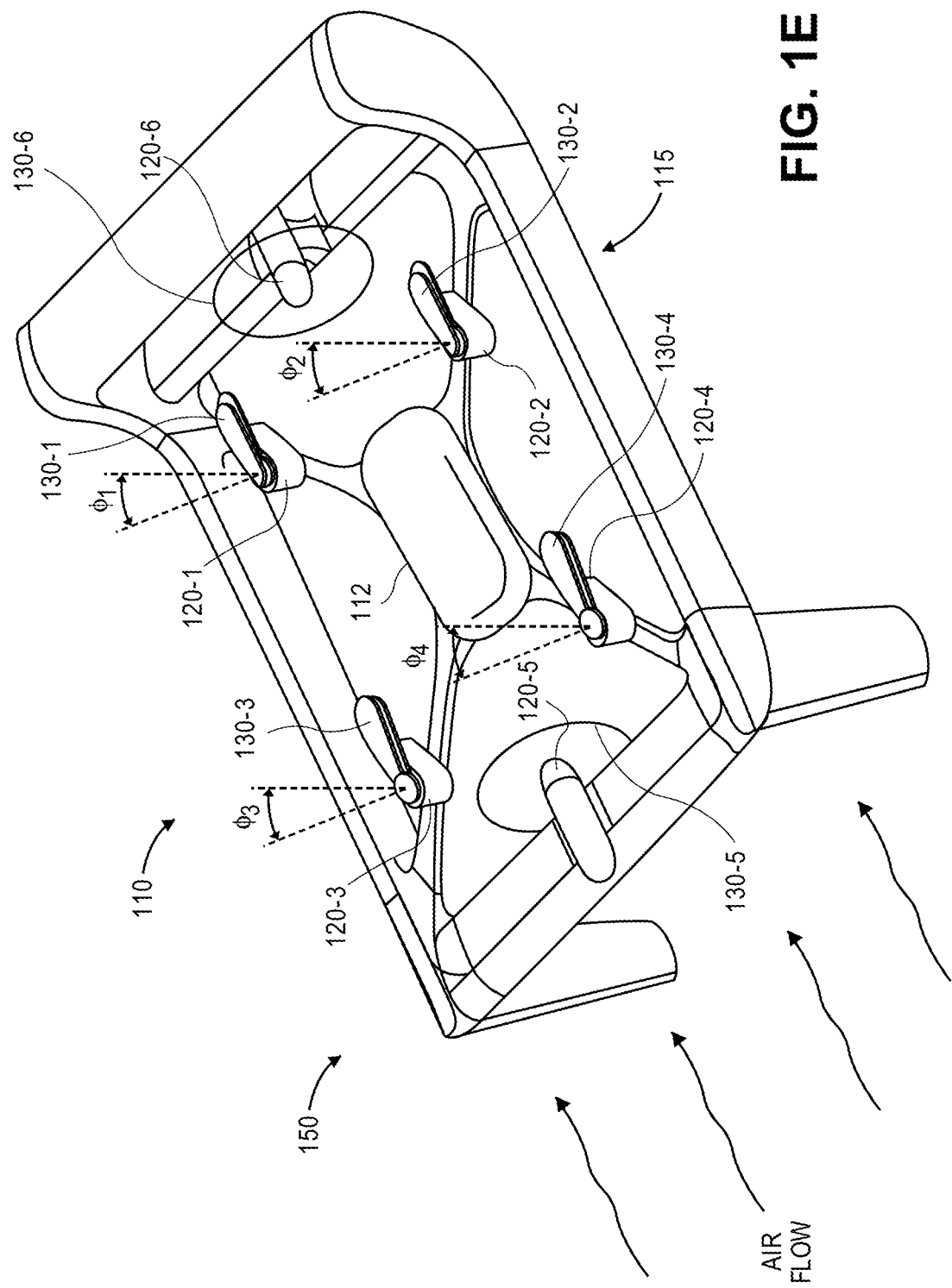

As is shown in FIG. 1E, the aerial vehicle 110 is engaged in a forward-flight operation, e.g., with the motors 120-5, 120-6 operating, and with the motors 120-1, 120-2, 120-3, 120-4 stopped. Thus, the propellers 130-3, 130-4 are shown with the blades 132-3, 132-4 coaligned with the blades 134-3, 134-4, on the same side of the axes of rotation of the propellers 130-3, 130-4 and opposite the direction of wind flow at least in part, such as is shown in FIG. 1C. The propellers 130-1, 130-2 are shown with the blades 132-1, 132-2 folded over the hubs, aligned on the same side of the axes of rotation of the propellers 130-1, 130-2 as the blades 134-1, 134-2 and opposite the direction of wind flow at least in part, such as is shown in FIG. 1D. The configurations of the propellers 130-1, 130-2, 130-3, 130-4 thus reduces the extent of drag created by such propellers when the motors 120-1, 120-2, 120-3, 120-4 are not operating.

Accordingly, embodiments of the systems and methods disclosed herein may include propulsion units having propellers with one or more blades that may be repositioned with respect to their respective hubs when the propellers are not rotating under power. The blades may be configured to reposition in a manner that causes centers of mass of each of the blades of a propeller to be provided on a common side of an axis of rotation of the propeller, such that the blades automatically align in a direction opposite to a direction of wind flow even where the axis of rotation of the propeller is not normal to the direction of wind flow, in a manner similar to a wind vane or weather vane. In some embodiments, a pivotable blade may be mounted to a root that is permitted to slide, translate or otherwise be repositioned within a track or slot (e.g., a slotted guide track) provided on a hub. The track or slot may have an end corresponding to an operating perimetric position of the pivotable blade (e.g., where the pivotable blade should be positioned as the propeller is rotating under power from a motor), as well as an end corresponding to a stopped perimetric position of the pivotable blade (e.g., where the pivotable blade should be positioned when the propeller is not rotating under power from the motor), that is coaligned or corresponds to a parametric position of a fixed blade. The pivotable blade and the fixed blade may be joined to roots by hinged connections that further permit the blades to pivot or rotate about tangential axes and to be more closely aligned in directions opposite to wind flow. Additionally, in some embodiments, a pivotable blade may be mounted to a hub in a manner that permits the pivotable blade to fold over the hub, such that a center of mass of the pivotable blade and a center of mass of a fixed blade mounted to the hub are commonly aligned on a common side of an axis of rotation of the propeller.

Although each of the propellers 130-1, 130-2, 130-3, 130-4 is shown as including a pair of blades, e.g., blades 132-1, 132-2, 132-3, 132-4 and blades 134-1, 134-2, 134-3, 134-4, the propulsion units of the present disclosure may feature propellers having two or more pivotable blades. For example, referring again to FIG. 1C, which shows the first blade 132-3 pivoting by approximately one hundred eighty degrees (180°) about an axis of the propeller 130-3, or from one side of the hub to an antipodal side of the hub, to coalign with the second blade 134-3, the propeller 130-3 may be equipped with two pivotable blades 132-3 and the second blade 134-3, each of which may be pivotably mounted to the hub of the propeller 130-3 at perimetric positions located approximately one hundred twenty degrees (120°) from one another when the propeller 130-3 is being rotated by the motor 120-3. When the motor 120-3 stops, the two pivotable blades 132-3 may be configured to each pivot or rotate approximately one hundred twenty degrees (120°) into coalignment with the second blade 134-3. Any number of pivotable blades may be utilized in accordance with the present disclosure.

In some embodiments, a propeller may be configured with one or more tension operators that may be used to cause a pivotable blade to be unfolded from above a hub or other aspect of the propeller, and to return to an operating perimetric position about the hub. For example, a tension operator may be a band, a cable, a tape or another member provided in tension that is mounted to an underside of a pivotable blade that is folded above a hub of a propeller. Prior to or concurrent with a starting of a motor to which the propeller is mounted, a control system having one or more computer processors may cause a tension operator engaged with the pivotable blade to urge the pivotable blade radially outward from above the hub, and to return to the operating perimetric position. A propeller may also be configured with one or more compression operators that may be used to cause a pivotable blade to be unfolded from above a hub or other aspect of the propeller, and to return to an operating perimetric position about the hub. For example, a compression operator may be a rigid member that may be mounted to a motor shaft or a hub, within a motor shaft or a hub, or in association with a motor shaft or a hub, and configured to extend axially upward toward and in contact with a pivotable blade folded thereover. Prior to or concurrent with a starting of a motor to which the propeller is mounted, a control system having one or more computer processors may cause a compression operator to come into contact with a portion of the pivotable blade, and to thereby urge the pivotable blade to unfold from above the hub, and to return to the operating perimetric position. Alternatively, a compression operator may be a rigid member that may be mounted to an upper side of the pivotable blade and be caused to urge the pivotable blade radially outward from above the hub, and to return to the operating perimetric position.

Moreover, one or more actuators may also be provided and configured to urge a pivotable blade into a desired position or orientation with respect to a hub of a propeller. For example, referring again to FIG. 1C, the first blade 132-3 may be mounted to a hub of the propeller 130-3 by a slidable, translatable or repositionable root having one or more springs or other biasing elements that are configured to urge the root into alignment with the second blade 134-3. When the motor 120-3 is operating, centrifugal forces acting on the first blade 132-3 may overcome the spring forces or biasing forces generated by the springs or other biasing elements, and cause the first blade 132-3 to be aligned in an operating perimetric position on an opposite side of the axis of rotation of the propeller 130-3 from the second blade 134-3. When the motor 120-3 is not operating, however, and the propeller 130-3 begins to slow, the centrifugal forces acting on the first blade 132-3 may urge the first blade 132-3 into coalignment with the second blade 134-3, such that a center of mass of the first blade 132-3 is provided on the same side of the axis of rotation of the propeller 130-3 as the second blade 134-3. Alternatively, a spring or other biasing element may be provided to urge the first blade 132-3 into an operating perimetric position, and the spring or biasing force may be overcome by sufficient wind forces to cause the first blade 132-3 into coalignment with the second blade 134-3.

Similarly, referring again to FIG. 1D, the first blade 132-1 may be mounted to the hub by a hinged root having one or more springs or other biasing elements that are configured to urge the first blade 132-1 to rotate toward the second blade 134-1. When the motor 130-1 is operating, centrifugal forces acting on the first blade 132-1 may overcome the spring or biasing forces provided by such elements, and urge the first blade 132-1 into an orientation extending radially outward from the hub. When the motor 120-1 stops operating, however, and the propeller 130-1 begins to slow, the centrifugal forces acting on the first blade 132-1 may urge the first blade 132-1 into a folded position over the hub, such that a center of mass of the first blade 132-1 is provided on the same side of the axis of rotation of the propeller 130-1 as a center of mass of the second blade 134-1. Alternatively, a spring or other biasing element may be provided to urge the first blade 132-1 into an operating perimetric position extending radially outward from the hub, and the spring or biasing force may be overcome by sufficient wind forces to cause the first blade 132-1 to fold over the hub.

Figure 2:
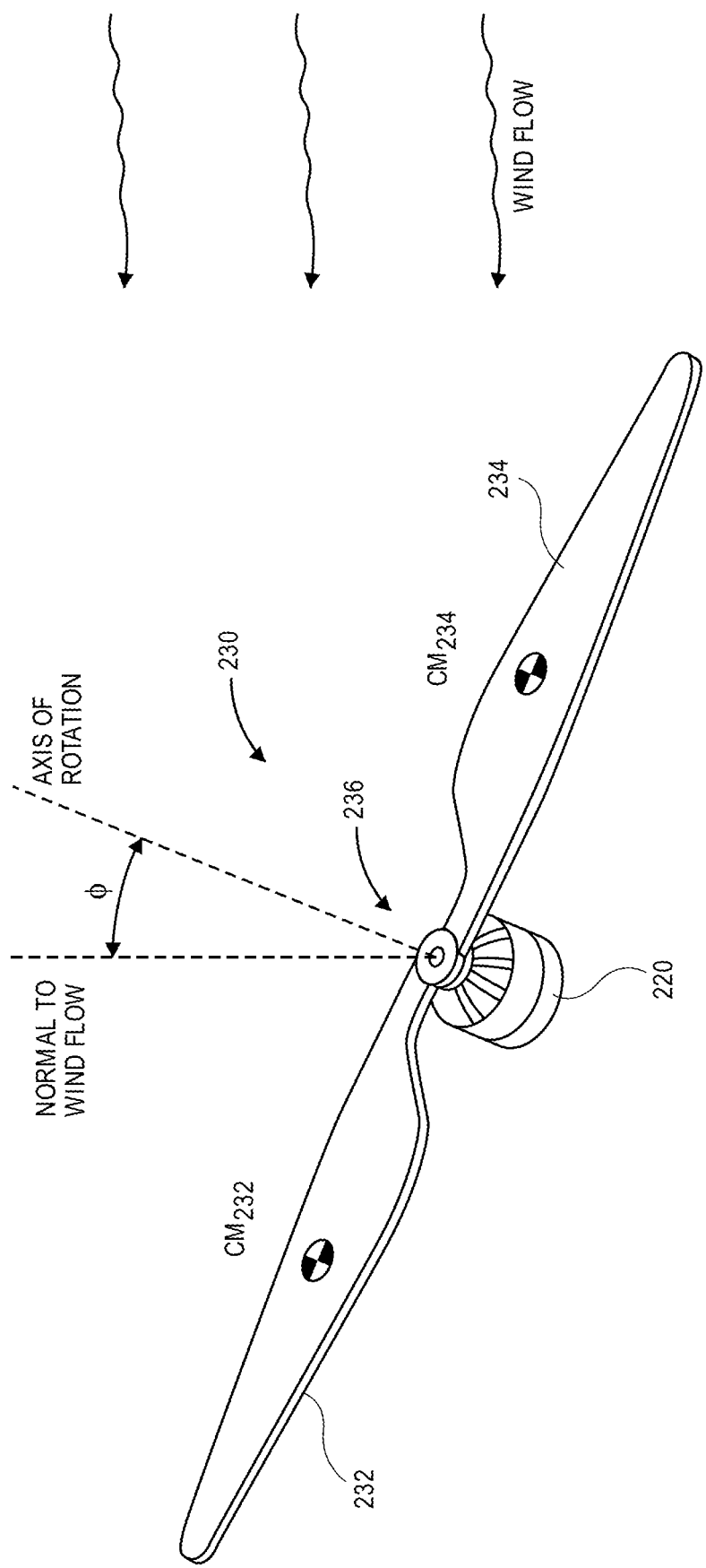
FIG. 2 is a view of aspects of one propeller in accordance with embodiments of the present disclosure.

Some embodiments of the systems and methods disclosed herein are directed to placing the centers of mass of each of the blades of a propeller on common sides of an axis normal to a direction of wind flow, when the propeller has an axis of orientation that is not normal to the direction of wind flow. Referring to FIG. 2, aspects of one propeller 230 in accordance with embodiments of the present disclosure are shown. Except where otherwise noted, reference numerals preceded by the number "2" shown in FIG. 2 indicate components or features that are similar to components or features having reference numerals preceded by the number "1" shown in FIGS. 1A through 1E.

As is shown in FIG. 2, the propeller 230 is rotatably coupled to a motor 220 and configured to rotate about an axis of rotation that is provided at an angle $\phi$ with respect to an axis normal to a direction of wind flow. The propeller 230 includes a first blade 232 and a second blade 234. In accordance with some embodiments of the present disclosure, the second blade 234 may be mounted about a hub 236 of the propeller 230 in a manner that enables a center of mass $CM_{234}$ of the second blade 234 to reside on opposite sides of the axis of rotation of the propeller 230 as a center of mass $CM_{232}$ of the first blade 232 during operation of the propeller 230, and on the same side of the axis of rotation of the propeller 230 as the center of mass $CM_{232}$ of the first blade 232 when the propeller 230 is not operating. For example, the second blade 234 may be mounted to the hub 236 by a pivotable or rotatable root that may reposition itself about a perimeter of the hub 236 from a perimetric position associated with normal operations, such as is shown in FIG. 2, to a perimetric position that is antipodal to the perimetric position shown in FIG. 2 when the motor 220 is not operating, such as by pivoting the second blade 234 about the axis of rotation, such as is shown in FIG. 1C. Alternatively, the second blade 234 may be mounted to the hub 236 by a hinged root that enables the second blade 24 to reposition itself with respect to the hub 236, e.g., by folding the second blade 234 over the hub 236, such as is shown in FIG. 1D.

When the center of mass $CM_{232}$ of the first blade 232 and the center of mass $CM_{234}$ of the second blade 234 are aligned on the same side of the axis of rotation of the propeller 230, and the motor 220 is not operating, the propeller 230 will align such that the first blade 232 and the second blade 234 act as a wind vane or weather vane, and are oriented opposite a direction of the wind flow. Subsequently, when operation of the propeller 230 is desired, the motor 220 may be started, and centrifugal forces acting on the second blade 234 may urge the second blade 234 into the orientation shown in FIG. 2, viz., with the second blade 234 provided at a diametrically opposite orientation with respect to the first blade 232. Additionally, the propeller 230 may be outfitted with one or more operators (e.g., a tension operator and/or a compression operator, as well as a spring or other biasing element) to urge the second blade 234 into the orientation shown in FIG. 2 prior to or concurrently while initiating operation of the motor 220.

Additionally, the various components of the propeller 230 may be formed from any suitable materials that may be selected based on an amount of lift that may be desired in accordance with the present disclosure. In some implementations, aspects of one or more of the blades 232, 234 and/or the hub 236 may be formed from one or more plastics (e.g., thermosetting plastics such as epoxy or phenolic resins, polyurethanes or polyesters, as well as polyethylenes, polypropylenes or polyvinyl chlorides), wood (e.g., woods with sufficient strength properties such as ash), metals (e.g., lightweight metals such as aluminum, or metals of heavier weights including alloys of steel), composites or any other combinations of materials. In some implementations, the aspects of the blades 232, 234 and/or the hub 236 may be formed of one or more lightweight materials including but not limited to carbon fiber, graphite, machined aluminum, titanium, fiberglass, wood or plastic. Furthermore, in some embodiments, the various components of the propeller 230 may be formed by modifying a standard propeller of any type, size, shape or form.

Additionally, the various components of the propeller 230 may be solid or substantially solid, and formed from one or more homogenous or heterogeneous materials. Alternatively, the various components of the propeller 230 may be substantially hollow, e.g., with a solid skin defining an airfoil having a hollow cavity therein, with one or more internal supports or structural features for maintaining a shape of the airfoil. For example, the propeller 230 or portions thereof may be formed from durable frames of stainless steel, carbon fibers, or other similarly lightweight, rigid materials and reinforced with radially aligned fiber tubes or struts. Utilizing a propeller 230 having a substantially hollow cross-section thereby reduces the mass of the propeller 230, and enables wiring, cables and other conductors or connectors to be passed therethrough, and in communication with one or more other control systems components or features. The propeller 230 or such portions thereof may further be filled with foam or other fillers, strengthened with walls or other supports, and covered with flexible skins for resisting moisture, erosion or any other adverse effects of the elements.

Referring to FIGS. 3A through 3D, views of aspects of one propeller 330 in accordance with embodiments of the present disclosure are shown. Except where otherwise noted, reference numerals preceded by the number "3" shown in FIGS. 3A through 3D indicate components or features that are similar to components or features having reference numerals preceded by the number "2" shown in FIG. 2 or by the number "1" shown in FIGS. 1A through 1E.

Figure 3A:
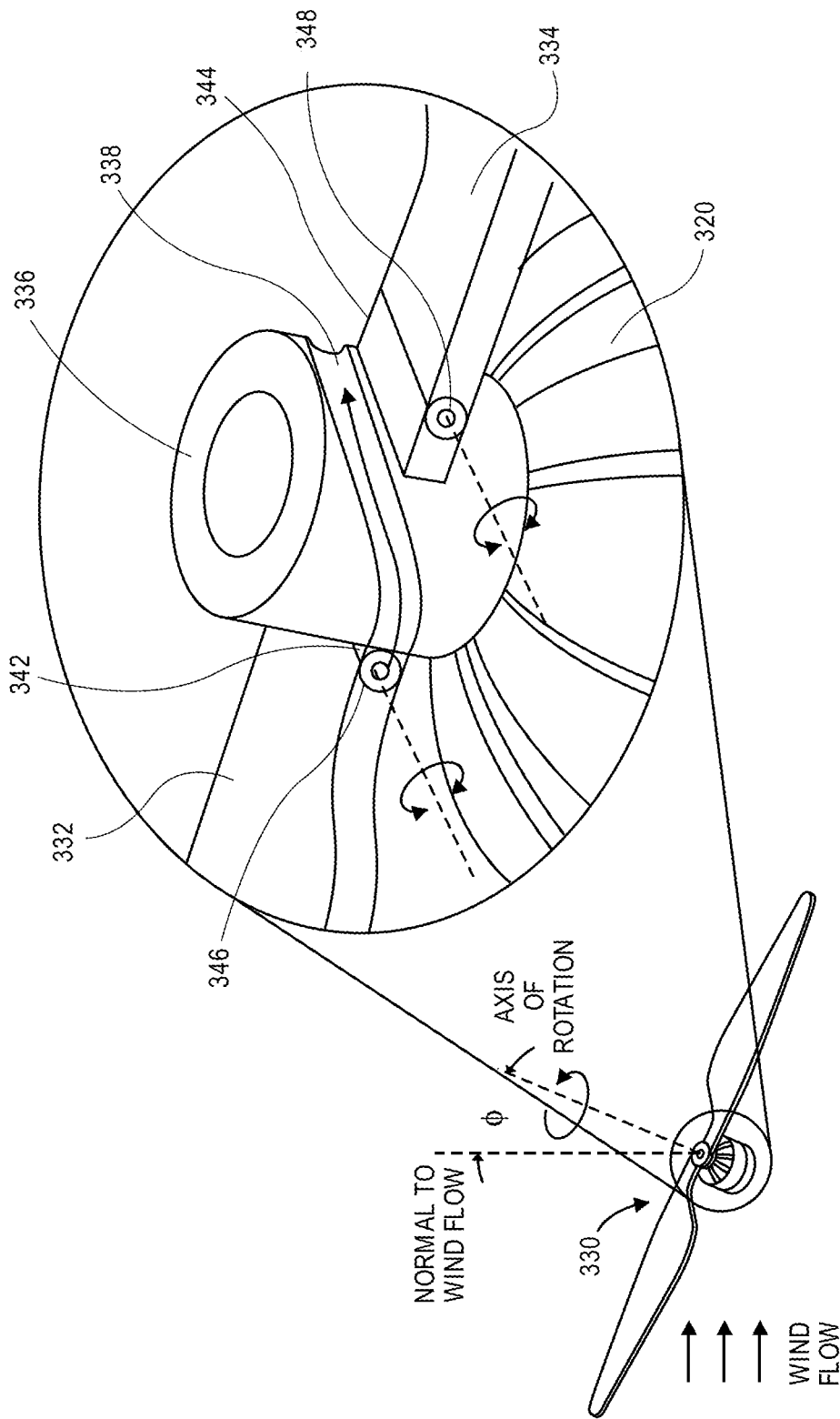
FIGS. 3A through 3D are views of aspects of one propeller in accordance with embodiments of the present disclosure.

As is shown in FIG. 3A, the propeller 330 is mounted to a motor 320 and configured for rotation about an axis of rotation that is provided at a positive angle $\phi$ with respect to a normal to the direction of wind flow. The propeller 330 comprises a first blade 332 and a second blade 334 mounted to a hub 336, which is coupled to a shaft (not shown) of the motor 320. The first blade 332 is joined to a slidable root 342 by a hinged connection 346. The second blade 334 is joined to a fixed root 344 by a hinged connection 348.

The hub 336 includes a track 338 (or slot) provided about and/or within an external perimeter of the hub 336. The slidable root 342 is slidably mounted within the track 338, which has a first end corresponding to a perimetric position of the first blade 332 shown in FIG. 3A, and a second end corresponding to a perimetric position provided in association with a perimetric position at which the fixed root 344 is fixed to the hub 336. The second end of the track 338 is provided at a different axial position on the hub 336, such that when the slidable root 342 is translated to the second end of the track 338, the slidable root 342 and the fixed root 344 will be provided in close proximity to one another, e.g., with a limited vertical or axial separation between the slidable root 342 at the second end of the track 338 and the fixed root 344, and in a common plane with the axis of the motor 320, but will not contact one another. Additionally, the hinged connection 346 and the hinged connection 348 enable the first blade 332 and the second blade 334 to rotate or pivot about axes that are aligned substantially tangential to the hub 336.

Figure 3B:
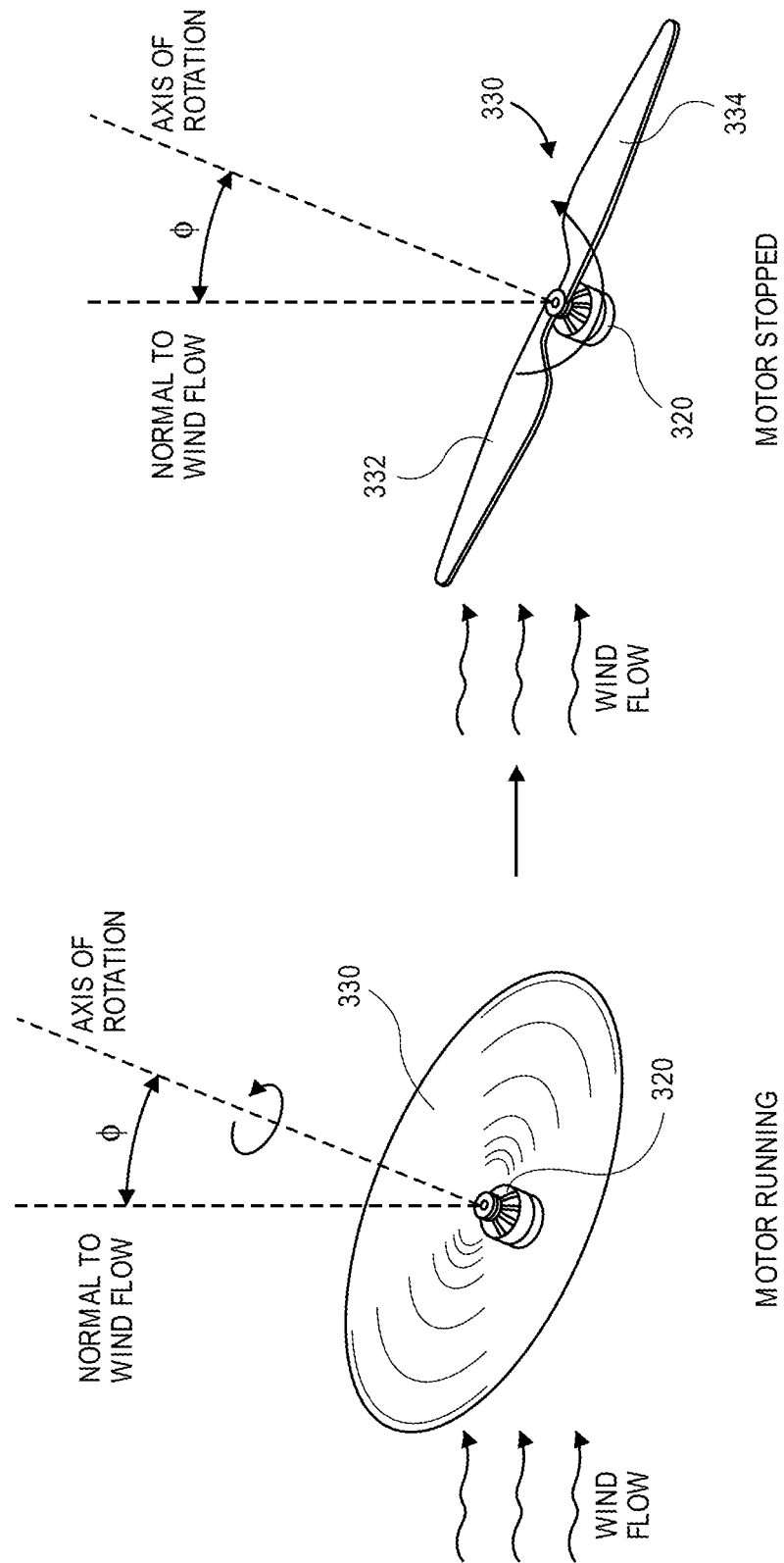

As is shown in FIG. 3B, with the motor 320 running, the propeller 330 rotates about the axis of rotation, which is aligned at the positive angle $\phi$ with respect to a normal to the direction of wind flow. With the motor 320 running, the first blade 332 resides at the first end of the track 338, on an opposite (or antipodal) side of the hub 336 from the second blade 334. When the motor 320 stops, the propeller 330 will slow until the second blade 334 is aligned opposite to the direction of the wind flow.

Figure 3C:
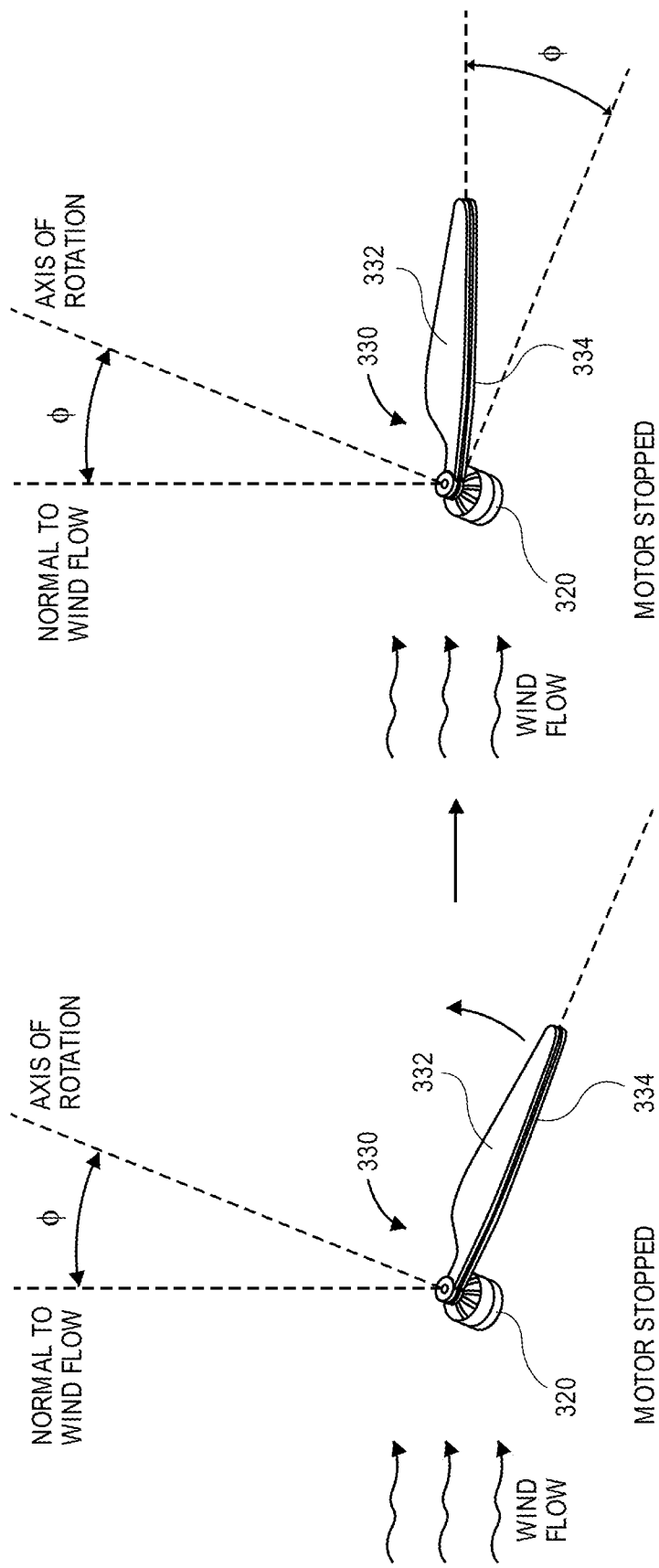

As is shown in FIG. 3C, the first blade 332 rotates freely about the axis of rotation, with the motor 320 stopped, as the slidable root 342 travels within the track 338 along the external perimeter of the hub 336. The slidable root 342 comes to a rest at the second end of the track 338 that is coaligned with the perimetric position of the fixed root 344.

Additionally, with the first blade 332 and the second blade 334 coaligned with one another, such as is shown in FIG. 3C, each of the first blade 332 and the second blade 334 may rotate about the respective hinged connections 346, 348 until axes of the first blade 332 and the second blade 334 are aligned in a direction opposite to the direction of the wind flow, e.g., at the positive angle φ with respect to the orientations of the axes of the first blade 332 and the second blade 334 during operation, in a manner similar to a wind vane or weather vane.

Figure 3D:
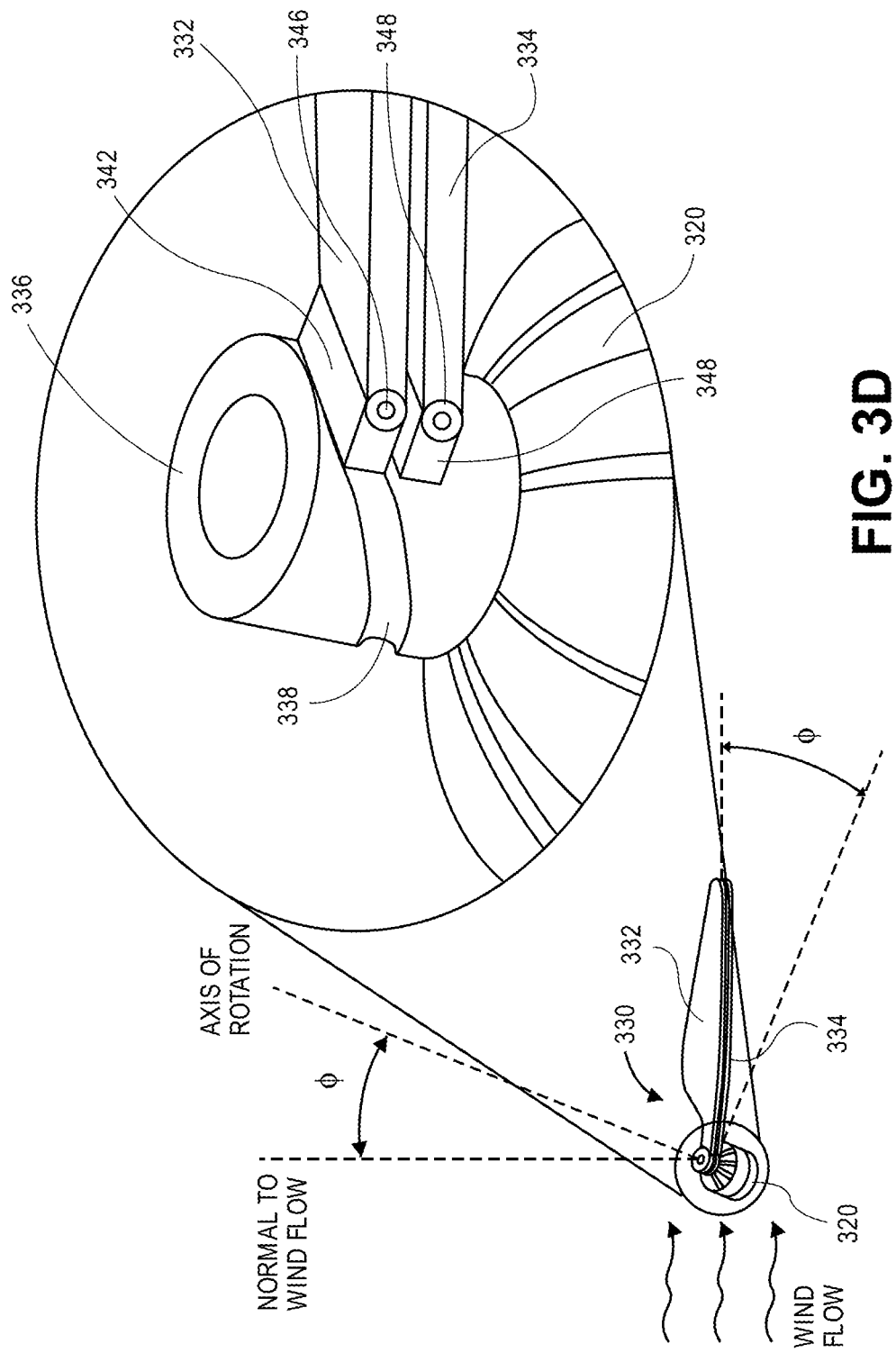

As is shown in FIG. 3D, the propeller 330 is shown with the slidable root 342 provided at the end of the track 338 corresponding to the perimetric position at which the fixed root 344 is mounted to the hub 336. The first blade 332 and the second blade 334 are shown in coalignment with one another, at the positive angle φ, and in a direction opposite to the direction of the wind flow, with centers of mass of each of the first blade 332 and the second blade 334 provided on the same side of the axis of rotation of the propeller 330, opposite the direction of the wind flow, and in a common plane with the axis of rotation. In the event that operation of the propeller 330 is desired, initiating an operation of the motor 320, e.g., by one or more control systems, and causing the propeller 330 to rotate about the axis of rotation will generate centrifugal forces that urge the slidable root 342 back to the first end of the track 338 corresponding to the perimetric position of the first blade 332 shown in FIG. 3A. Additionally, in some embodiments, the propeller 330 may include one or more springs or other biasing elements (e.g., torsion springs, coil springs, leaf springs) within the hub 336 or elsewhere for urging the first blade 332 into the second end of the track 338.

Referring to FIGS. 4A through 4E, views of aspects of one propeller 430 in accordance with embodiments of the present disclosure are shown. Except where otherwise noted, reference numerals preceded by the number "4" shown in FIGS. 4A through 4E indicate components or features that are similar to components or features having reference numerals preceded by the number "3" shown in FIGS. 3A through 3D, by the number "2" shown in FIG. 2 or by the number "1" shown in FIGS. 1A through 1E.

Figure 4A:
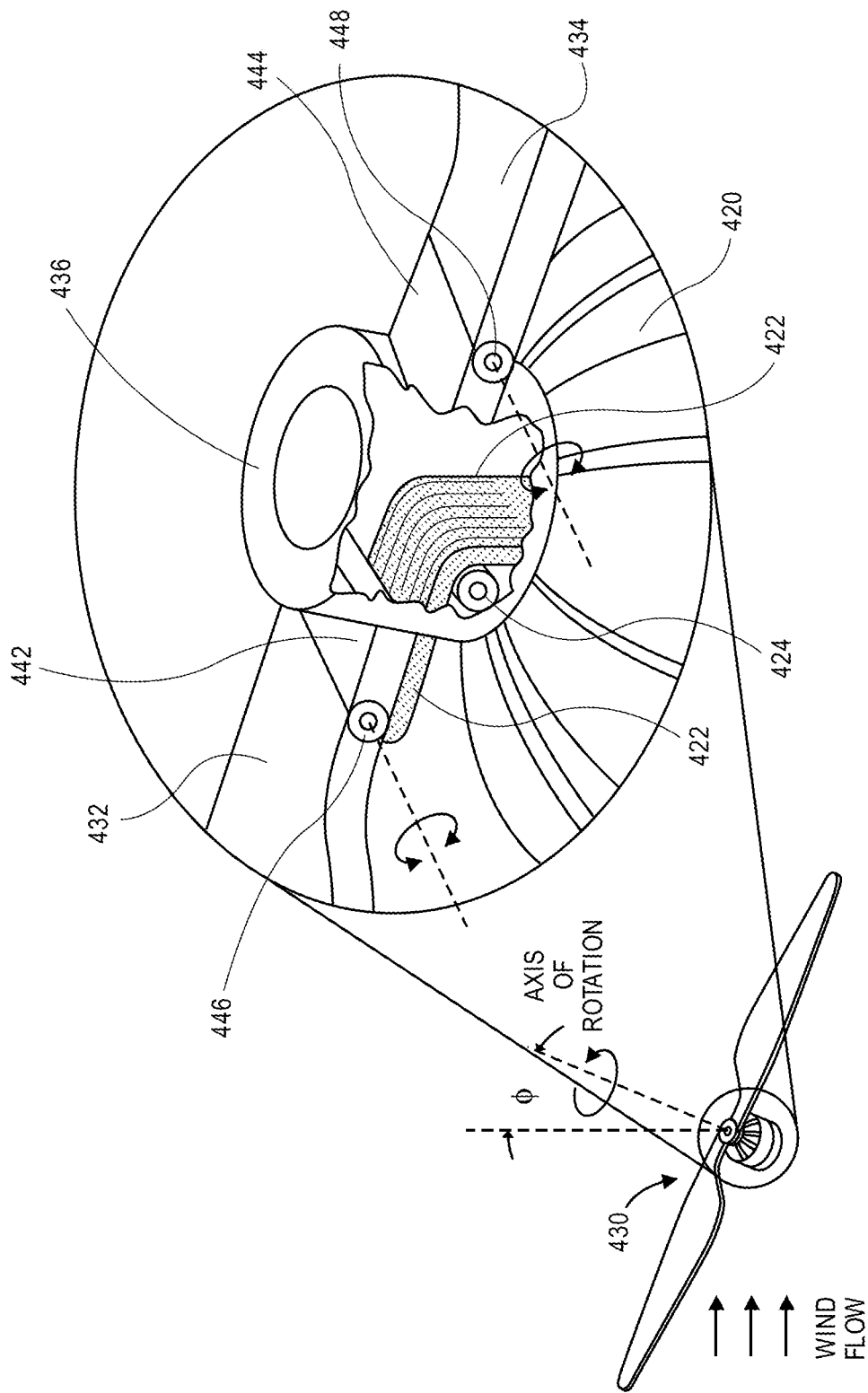
FIGS. 4A through 4E are views of aspects of one propeller in accordance with embodiments of the present disclosure.

As is shown in FIG. 4A, the propeller 430 is mounted to a motor 420 and configured for rotation about an axis of rotation that is provided at a positive angle φ with respect to a normal to the direction of wind flow. The propeller 430 comprises a first blade 432 and a second blade 434 mounted to a hub 436, which is coupled to a shaft (not shown) of the motor 420. The first blade 432 is joined to a root 442 by a hinged connection 446. The second blade 434 is joined to a root 444 by a hinged connection 448. The hinged connection 446 and the hinged connection 448 enable the first blade 432 and the second blade 434, respectively, to rotate or pivot about axes that are aligned substantially tangential to the hub 436.

As is also shown in FIG. 4A, the propeller 430 further includes a tension operator 422 that is joined to a proximal end of the first blade 432. The tension operator 422 extends beneath the root 442 and through an opening in an external perimeter of the hub 436. Within the hub 436, the tension operator 422 is angled about a spool 424 or other feature. When the propeller 430 is rotating under power of the motor 420, centrifugal forces urge the first blade 432 and the second blade 434 into orientations extending radially outward from the hub 436. When the propeller 430 is not rotating under power of the motor 420, however, an angle of the first blade 432 may be varied by applying different levels of tension to the first blade 432 by the tension operator 422, e.g., by easing a tensile force applied to the tension operator 422, or by increasing the tensile force applied to the tension operator 422, as desired. The tension and/or tensile force may be provided in any manner, e.g., by one or more motors, servos, or other systems that may be mounted within the hub 436 and/or the motor 420. For example, the tension operator 422 may be mounted in association with a motor shaft of the motor 420, or any other component of the motor, by which tension and/or tensile forces may be imposed upon the tension operator 422 in any manner.

Figure 4B:
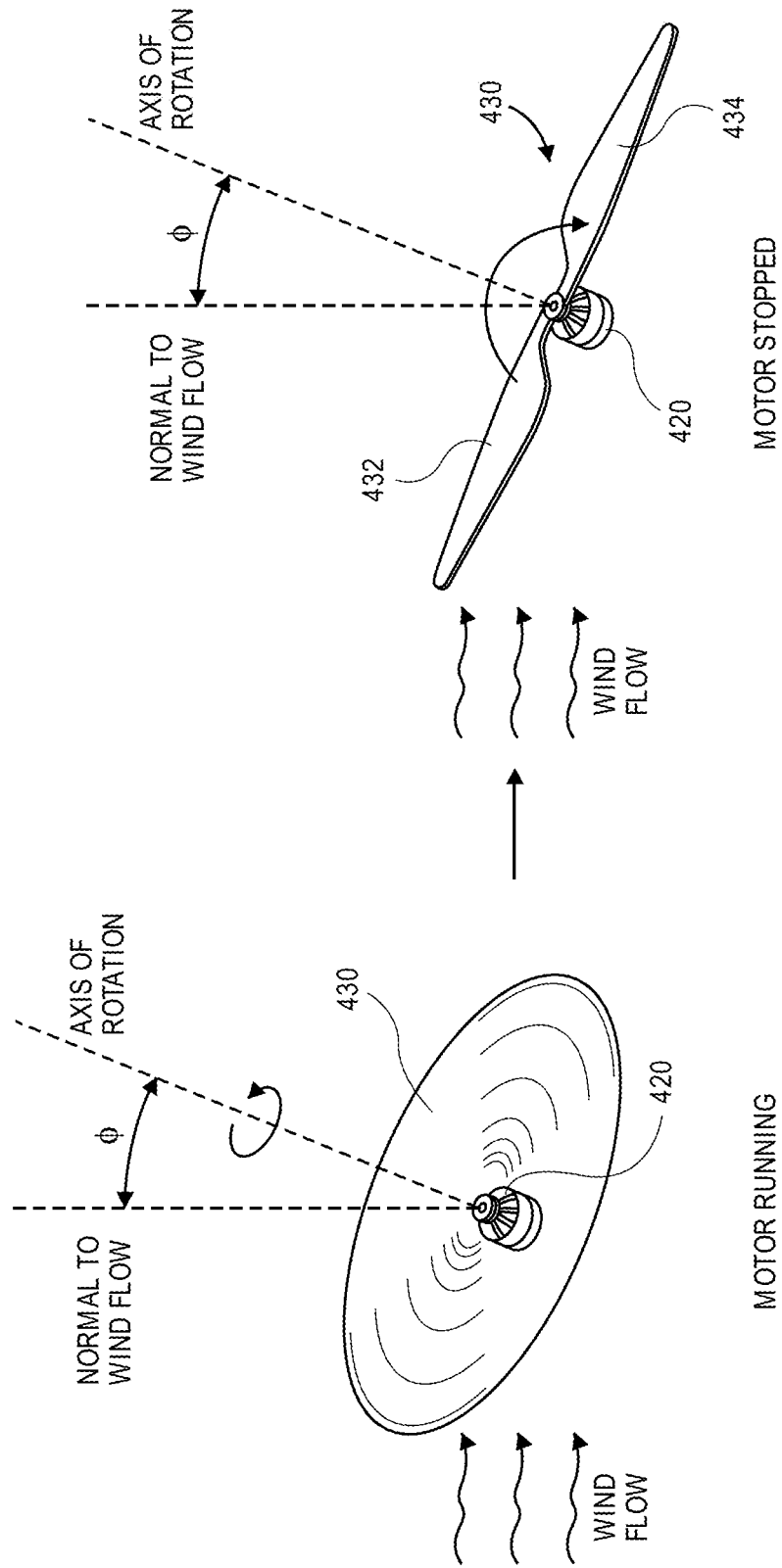

As is shown in FIG. 4B, with the motor 420 running, the propeller 430 rotates about the axis of rotation, which is aligned at the positive angle φ with respect to a normal to the direction of wind flow. When the motor 420 stops, e.g., by one or more control systems, the propeller 430 will slow until the second blade 434 is aligned opposite to the direction of the wind flow.

Figure 4C:
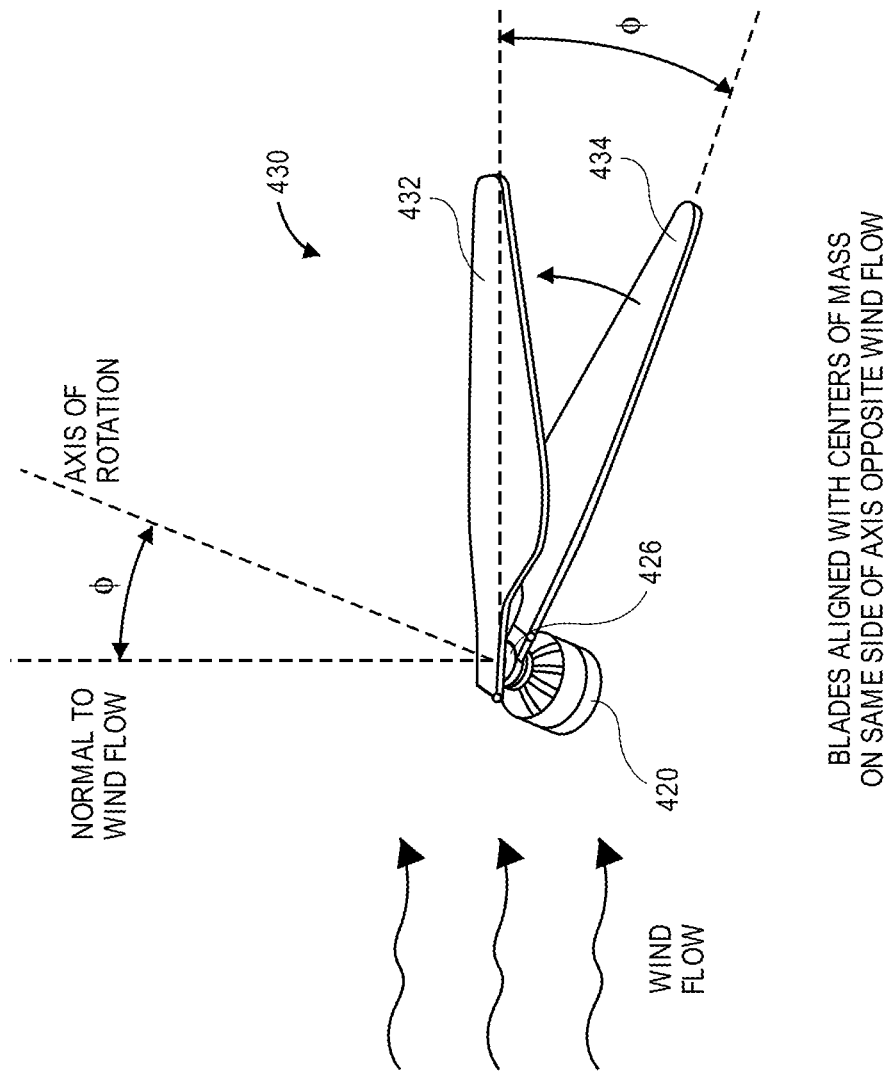

As is shown in FIG. 4C, with the motor 420 stopped, the first blade 432 folds over the hub 436 about the axis defined by the hinged connection 446, in the presence of the wind flow. As a result, and as is shown in FIG. 4C, centers of mass of each of the first blade 432 and the second blade 434 are provided on the same side of the axis of rotation of the propeller 430, opposite the direction of the wind flow, and in a common plane with the axis of rotation.

Figure 4D:
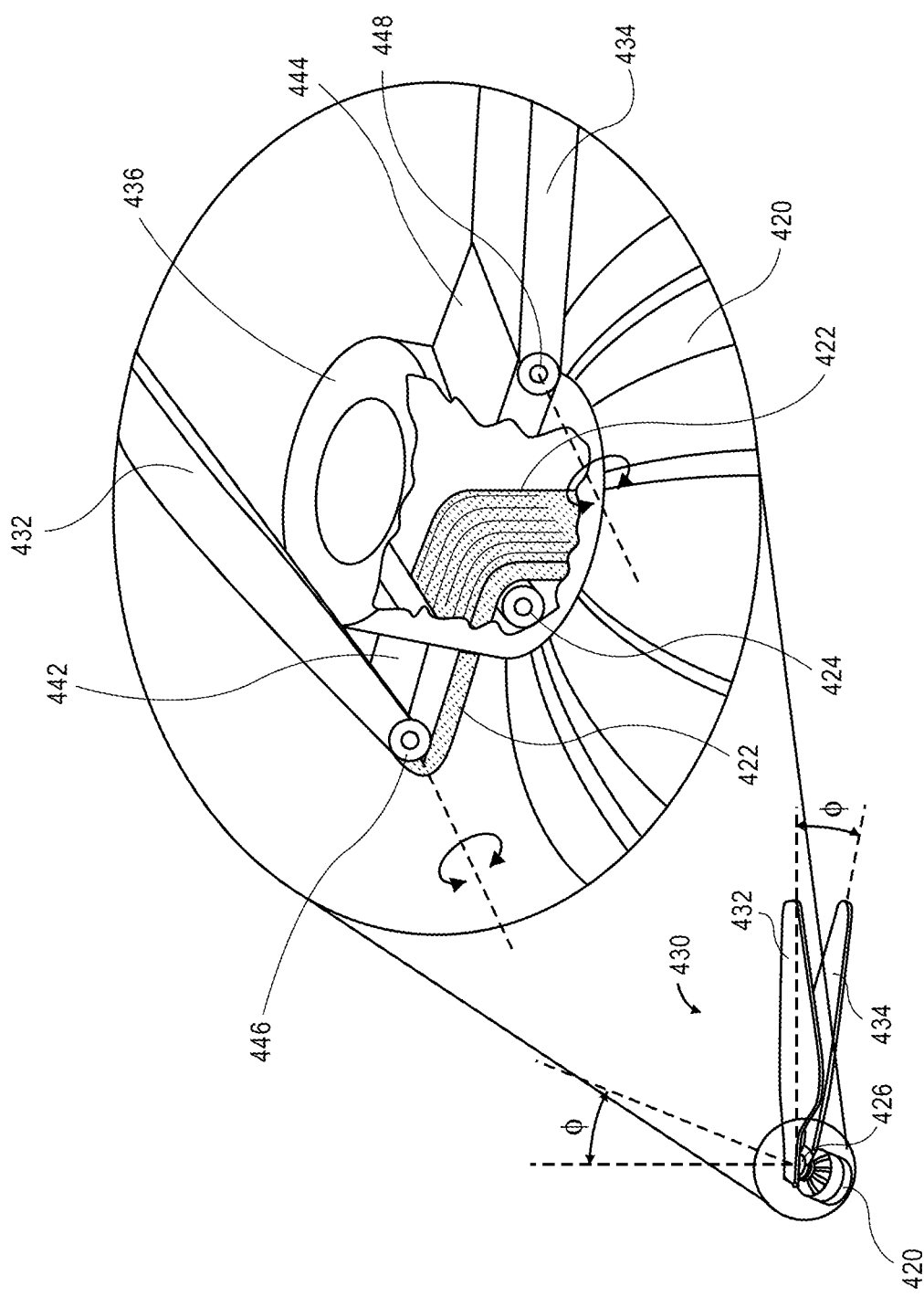

As is shown in FIG. 4D, the propeller 430 is shown with the first blade 432 folded over the hub 436 about the axis defined by the hinged connection 446. The first blade 432 may be permitted to rotate about the axis by easing the tensile force supplied to the tension operator 422.

Figure 4E:
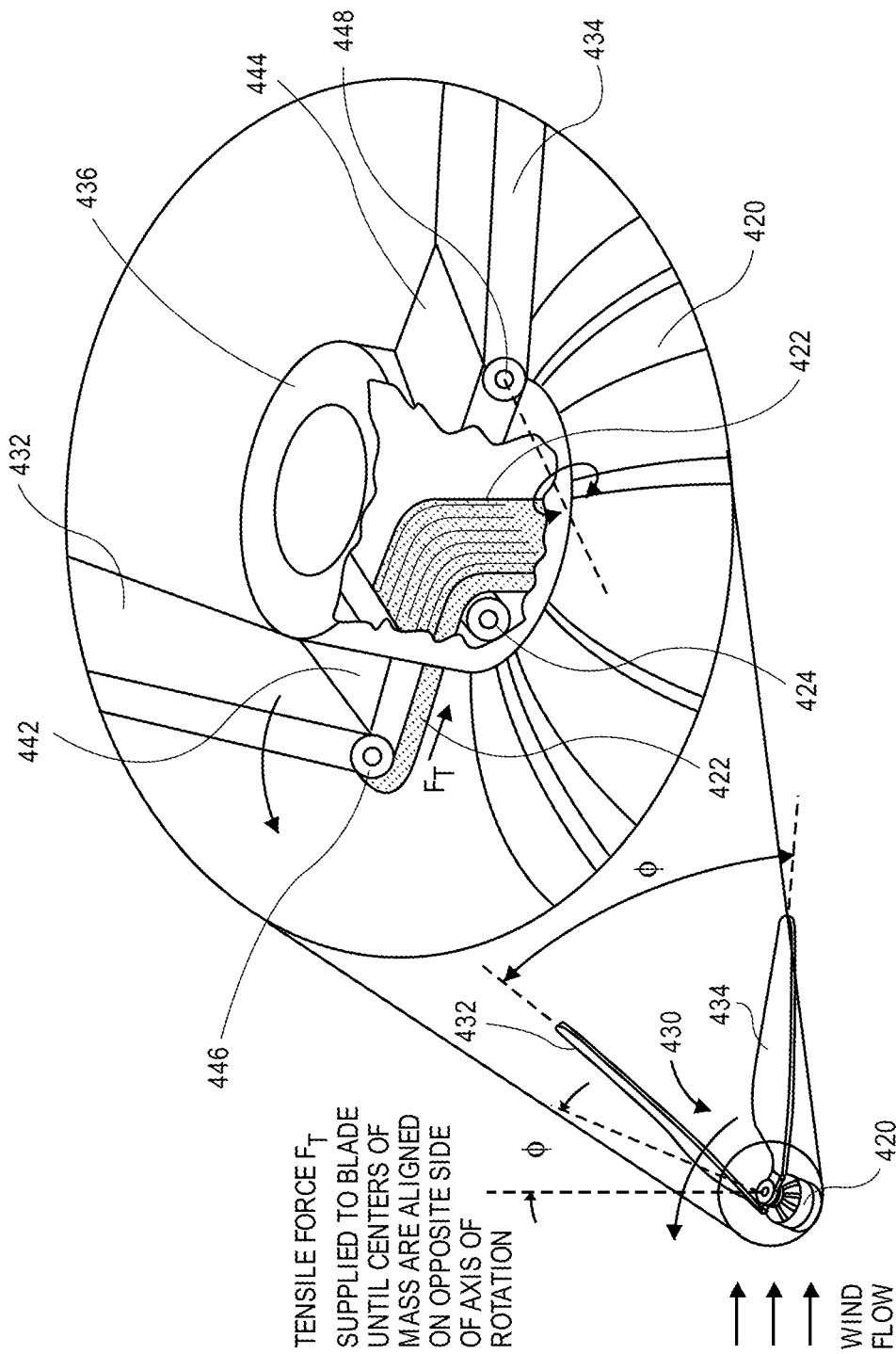

In accordance with some embodiments of the present disclosure, applying a tensile force to the tension operator 422 may cause a center of mass of the first blade 432 to return to an opposite side of the axis of rotation of the propeller 430 from a center of mass of the second blade 434. As is shown in FIG. 4E, the propeller is shown with a tensile force $F_T$ supplied to the tension operator 422, e.g., by one or more control systems. The tensile force $F_T$ causes the first blade 432 to rotate about the hinged connection 446, thereby restoring the center of mass of the first blade 432 to an opposite or antipodal side of the hub 436 with respect to the center of mass of the second blade 434. Prior to or concurrent with the tensile force $F_T$ to the tension operator 422, the motor 420 may be operated to cause the propeller 430 to begin rotating after the center of mass of the first blade 432 has crossed the axis of rotation of the propeller 430, or after the center of mass of the first blade 432 is beyond the normal to the wind flow. Additionally, in some embodiments, the propeller 430 may include one or more springs or other biasing elements (e.g., torsion springs, coil springs, leaf springs) within the hub 436 or elsewhere for urging the first blade 432 to fold over the hub 436 toward the second blade 434, and the tension operator 422 may be provided to overcome the biasing force and return the first blade 432 to an opposite side of the axis of rotation of the propeller 430.

Although the tension operator 422 is shown as being joined to a proximal end of the first blade 432 and not to the second blade 434, those of ordinary skill in the pertinent arts will recognize that tension operator 422 may be joined to any other aspect of the first blade 432, or to any aspect of the second blade 434, or any other blades of the propeller 430 (not shown), in accordance with the present disclosure.

Referring to FIGS. 5A through 5D, views of aspects of one propeller 530 in accordance with embodiments of the present disclosure are shown. Except where otherwise noted, reference numerals preceded by the number "5" shown in FIGS. 5A through 5D indicate components or features that are similar to components or features having reference numerals preceded by the number "4" shown in FIGS. 4A through 4E, by the number "3" shown in FIGS. 3A through 3D, by the number "2" shown in FIG. 2 or by the number "1" shown in FIGS. 1A through 1E.

Figure 5A:
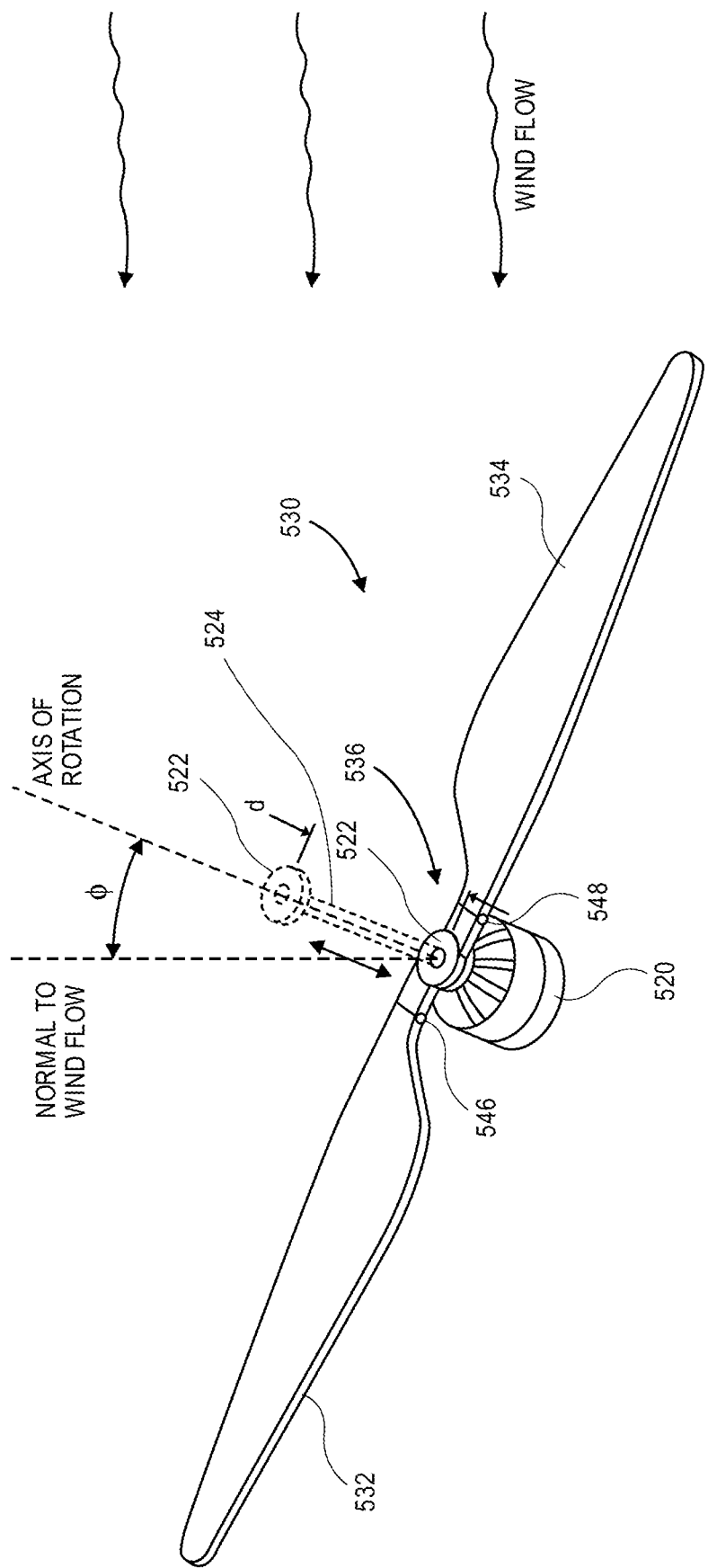
FIGS. 5A through 5D are views of aspects of one propeller in accordance with embodiments of the present disclosure.

As is shown in FIG. 5A, the propeller 530 is rotatably coupled to a motor 520 and configured to rotate about an axis of rotation that is provided at an angle φ with respect to an axis normal to a direction of wind flow. The propeller 530 includes a first blade 532, a second blade 534 and a compression operator 522. The first blade 532 is joined to the hub 536 by a hinged connection 546. The second blade 534 is joined to the hub 536 by a hinged connection 548. The hinged connection 546 and the hinged connection 548 enable the first blade 532 and the second blade 534, respectively, to rotate or pivot about axes that are aligned substantially tangential to the hub 536, or substantially parallel to a tangent of the hub 536. The compression operator 522 is coupled to an extender 524 associated with the hub 536 or a shaft of the motor 520, and is configured to extend in an axially outward and/or vertically upward direction with respect to the hub 536 and/or the motor 520, or to retract in an axially inward and/or vertically downward direction with respect to the hub 536 and/or the motor 520.

Figure 5B:
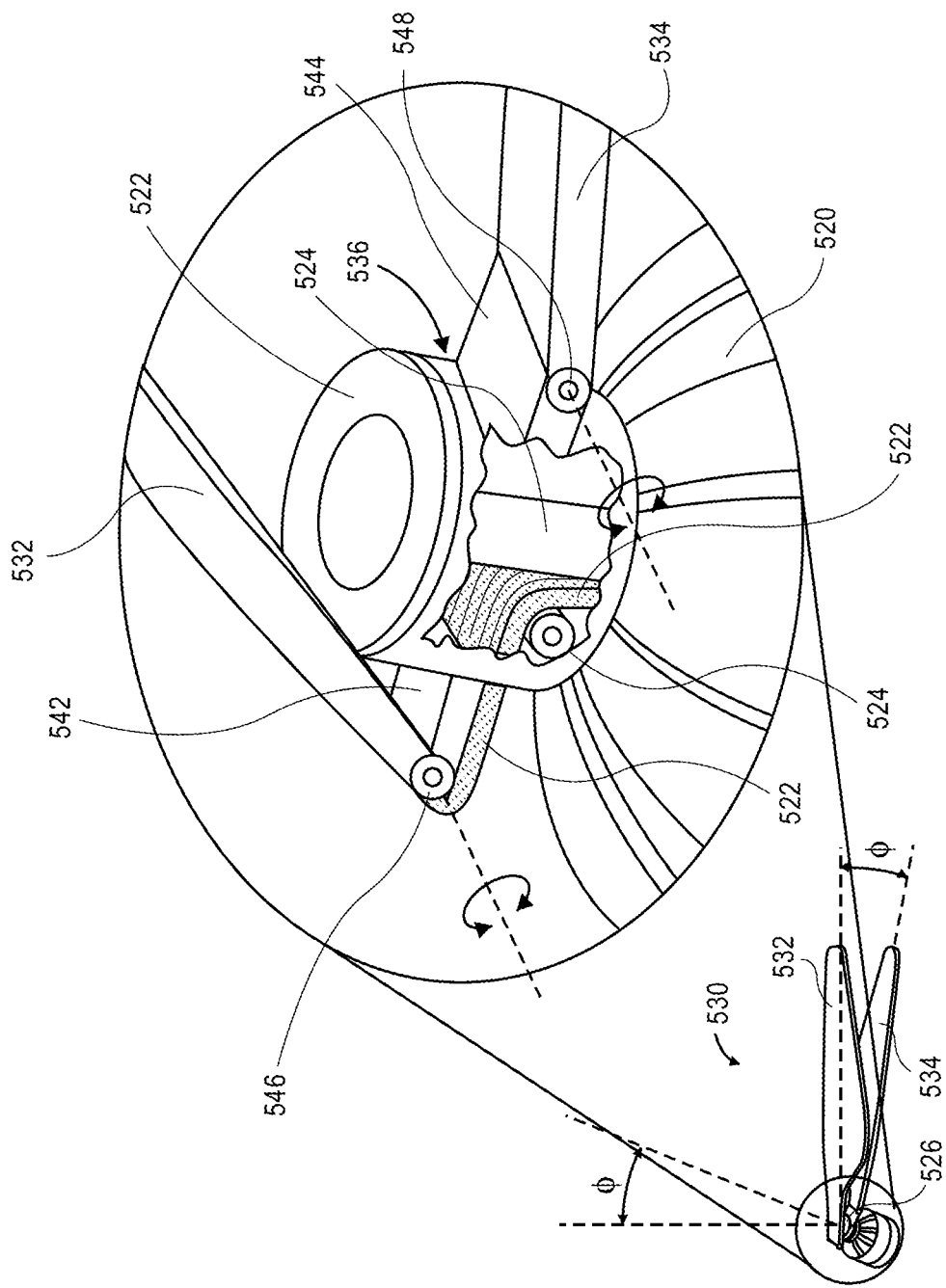

As is shown in FIG. 5B, the first blade 532 of the propeller 530 is folded over the hub 536 and the compression operator 522 about an axis defined by the hinged connection 546 when the propeller 530 is not operating under power of the motor 520. With the first blade 532 folded over the hub 536, a center of mass of the first blade 532 is on the same side of the axis of rotation of the propeller 530 as a center of mass of the second blade 534. As is also shown in FIG. 5B, a portion of the first blade 532 is in contact with a portion of the hub 536 and/or the compression operator 522 with the first blade 532 folded over the hub 536. Additionally, the second blade 534 is rotated about an axis defined by the hinged connection 548, until the second blade 534 is aligned opposite to a direction of the wind flow, when the propeller 530 is not operating under power of the motor 520.

Figure 5C:
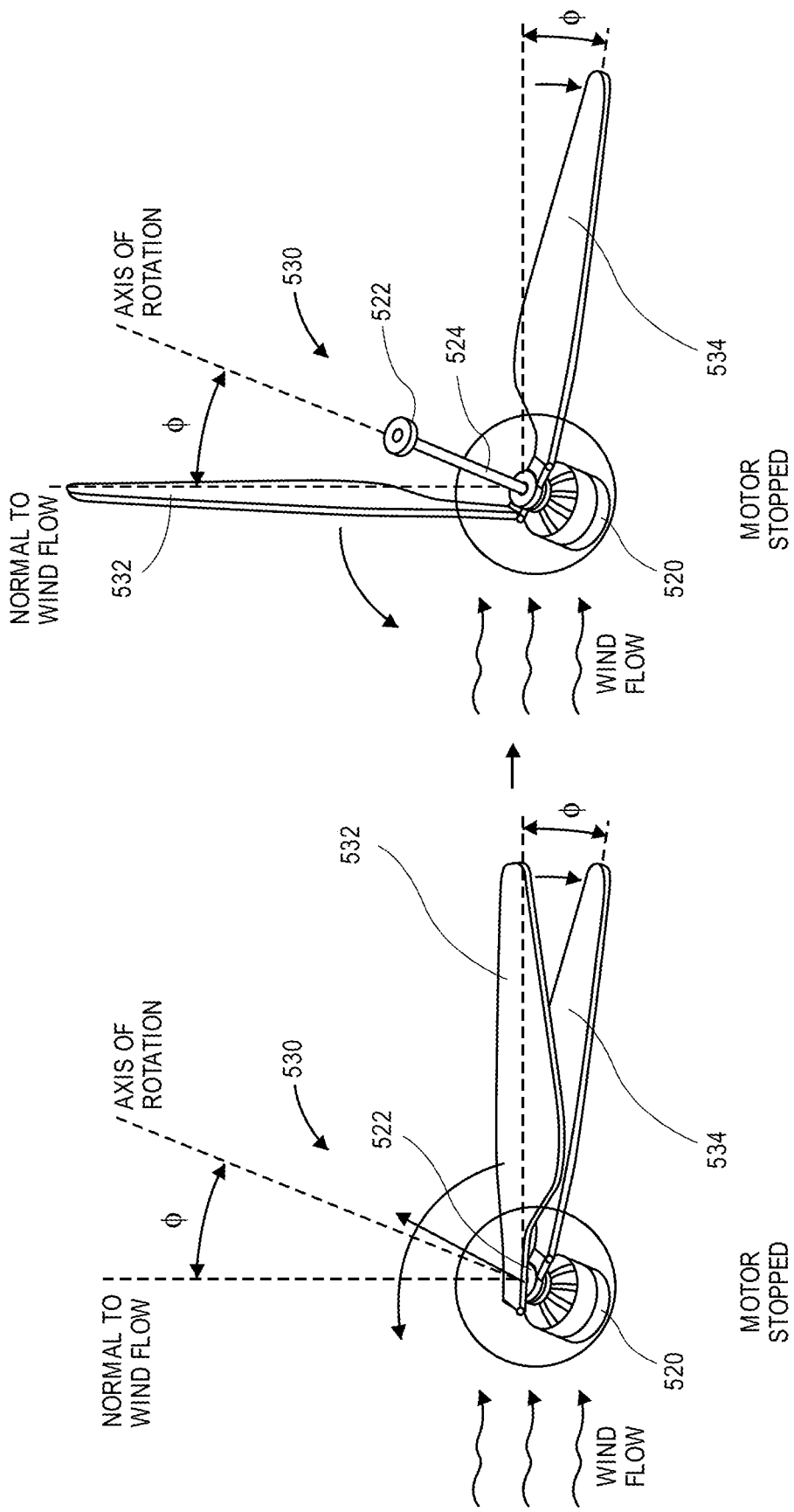

In accordance with some embodiments of the present disclosure, causing the compression operator 522 to extend in an axially outward and/or vertically upward direction with respect to the hub 536 and/or the motor 520 may urge a blade that is folded over the hub 536 to return to an opposite side of an axis of rotation of the propeller 530 from another blade. As is shown in FIG. 5C, with the motor 520 stopped, the first blade 532 is shown as being folded over the hub 536 in the presence of wind flow. By raising the compression operator 522 in an axially outward and/or vertically upward direction with respect to the hub 536, e.g., by the extender 524, under the control of one or more control systems, causes the first blade 532 to unfold until a center of mass of the first blade 532 has pivoted from a same side of the axis of rotation of the propeller 530 as a center of mass of the second blade 534 to an opposite side of the axis of rotation of the propeller 530 as the center of mass of the second blade 534. As is shown in FIG. 5D, prior to or concurrent with the extension of the compression operator 522, the motor 520 may be operated to cause the propeller 530 to begin rotating after the center of mass of the first blade 532 has crossed the axis of rotation of the propeller 530, or after the center of mass of the first blade 532 is beyond the normal to the wind flow.

Figure 5D:
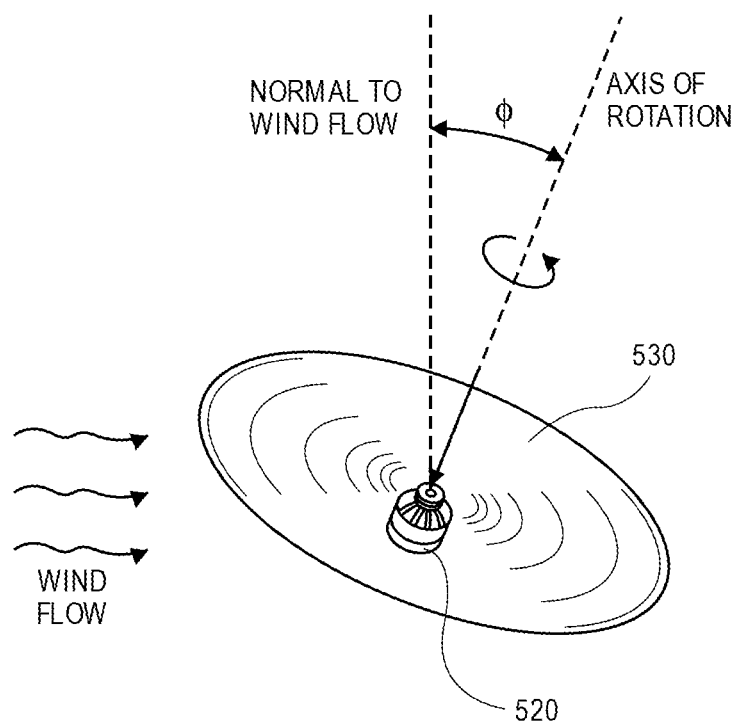

Additionally, as is also shown in FIG. 5D, prior to or concurrent with the operation of the motor 520, the compression operator 522 may be retracted in an axially inward and/or vertically downward direction with respect to the hub 536 and/or the motor 520, e.g., by the extender 524, under the control of one or more control systems. In some embodiments, the propeller 530 may include one or more springs or other biasing elements (e.g., torsion springs, coil springs, leaf springs) within the hub 536 or elsewhere for urging the first blade 532 to fold over the hub 536 toward the second blade 534, and the compression operator 522 may be provided to overcome the biasing force and return the first blade 532 to an opposite side of the axis of rotation of the propeller 530.

One advantage of the embodiment of the propeller 530 shown in FIGS. 5A through 5D is that either the first blade 532 or the second blade 534 may be folded over the hub 536 in the presence of wind flow when the motor 520 is not operating. For example, referring again to FIG. 5C, the compression operator 522 may be extended in an axially outward and/or vertically upward direction with respect to the hub 536 and/or the motor to urge either one of the first blade 532 or the second blade 534 to return to an opposite side of an axis of rotation of the propeller 530. Based on the construction of the compression operator 522, the first blade 532 and the second blade 534 are functional equivalents of one another.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed to achieve the same function(s) and/or result(s) described herein and which are included within the scope of the present disclosure.

For example, although some of the embodiments disclosed herein reference the use of propellers having pivotable and fixed blades provided aboard unmanned aerial vehicles, those of ordinary skill in the pertinent arts will recognize that uses of one or more of the propellers disclosed herein are not so limited, and may be utilized in connection with any type or form of aerial vehicle (e.g., manned or unmanned) where the use of such propellers is desired for less than an entire duration of flight or related operations, and preferably where the propellers are configured to rotate about axes that are not normal (or perpendicular to) a direction of wind flow.

Moreover, although some of the embodiments disclosed herein depict the use of propellers having two blades, e.g., a single pivotable blade and a single fixed blade, such as is shown in FIGS. 1A through 1E, the systems and methods of the present disclosure are likewise not so limited. Rather, the systems and methods of the present disclosure may be utilized in connection with propellers having any number of blades, and any portion of such blades may be fixed or collapsible in nature.

Moreover, two or more of the embodiments disclosed herein may be utilized in concert with one another. For example, in accordance with the present disclosure, a single propeller may include one or more blades that may pivot or rotate into alignment with one or more other blades, such as is shown in FIGS. 3B and 3C, as well as one or more blades that may be folded over a hub, such as is shown in FIGS. 4B and 4C. Additionally, a single propeller may include both a tension operator and a compression operator for causing a blade to be repositioned with respect to a hub and/or one or more other blades, as well as one or more springs or other biasing elements for urging one or more blades into a desired position about the hub.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
   a frame;
   a first motor mounted to the frame, wherein the first motor comprises a first shaft;
   a first propeller comprising a first hub, a first blade joined to a first root and a second blade joined to a second root,
      wherein the first hub is coupled to the first shaft and configured to rotate about a first axis defined by the first shaft during operation of the first motor,
      wherein the first hub comprises a first guide track defined within an outer perimeter of the first hub,
      wherein the first root is slidably mounted within the first guide track and configured to translate within the first guide track between a first perimetric position at a first end of the first guide track and a second perimetric position at a second end of the first guide track,
      wherein the first perimetric position is antipodal to the second perimetric position,
      wherein the second root is fixedly mounted to the first hub at a third perimetric position, and
      wherein the third perimetric position is coaligned with the second perimetric position;
   a second motor mounted to the frame, wherein the second motor comprises a second shaft; and
   a second propeller comprising a second hub, a third blade joined to a third root and a fourth blade joined to a fourth root,
      wherein the second hub is coupled to the second shaft and configured to rotate about a second axis defined by the second shaft during operation of the second motor.

2. The unmanned aerial vehicle of claim 1,
   wherein the first axis is not normal to a forward orientation of the unmanned aerial vehicle, and
   wherein the first axis is not parallel to the forward orientation of the unmanned aerial vehicle.

3. The unmanned aerial vehicle of claim 1, further comprising:
   at least one computer device in communication with the first motor and the second motor,
   wherein the at least one computer device is configured to:
   cause a first operation of the first motor at a first time;
   cause a second operation of the second motor at approximately the first time; and
   cause the first operation of the first motor to stop at a second time, wherein the second time follows the first time,
      wherein the first root is urged into the first perimetric position during the first operation of the first motor, and
      wherein the second root is urged into the second perimetric position after the first operation of the first motor is caused to stop.

4. The unmanned aerial vehicle of claim 1, wherein the first blade is joined to the first root at a first hinged connection,
   wherein the first blade is configured to pivot about the first hinged connection,
   wherein the second blade is joined to the second root at a second hinged connection, and
   wherein the second blade is configured to pivot about the second hinged connection.

5. The unmanned aerial vehicle of claim 1,
   wherein the first blade is formed from at least one material, wherein the second blade is formed from the at least one material, and wherein the at least one material is at least one of:
carbon fiber;
graphite;
machined aluminum;
titanium;
fiberglass;
wood; or
plastic.

6. A propulsion unit comprising:
a motor configured to rotate a shaft about a shaft axis; and
a propeller comprising a hub, a first blade and a second blade,
   wherein the hub is coupled to the shaft,
   wherein the first blade is pivotably joined to the hub by a first root,
   wherein the first root is configured to travel about the shaft axis between a first perimetric position on an external surface of the hub and a second perimetric position on the external surface of the hub,
   wherein the second blade is joined to the hub by a second root, and
   wherein the second root is fixed to the hub at a third perimetric position.

7. The propulsion unit of claim 6,
wherein the propulsion unit is mounted to a frame of an unmanned aerial vehicle having a forward orientation.

8. The propulsion unit of claim 7,
wherein the propulsion unit is mounted to the frame at a positive angle with respect to a normal to the forward orientation of the unmanned aerial vehicle.

9. The propulsion unit of claim 6,
wherein each of the second perimetric position and the third perimetric position is in a common plane with the shaft axis.

10. The propulsion unit of claim 6,
wherein the first perimetric position is antipodal to the second perimetric position.

11. The propulsion unit of claim 6,
wherein the hub comprises a track having a first end and a second end disposed in the external surface of the hub,
wherein the first end of the track corresponds to the first perimetric position,
wherein the second end of the track corresponds to the second perimetric position, and
wherein the first root is slidably mounted within the track and configured to travel between the first end of the track and the second end of the track.

12. The propulsion unit of claim 11,
wherein the first root is urged into the first end of the track during an operation of the motor.

13. The propulsion unit of claim 11,
wherein the hub further comprises a biasing element configured to urge the first root into the second end of the track when the motor is not operating.

14. The propulsion unit of claim 6,
wherein the first root is connected to the first blade at a first hinged connection defining a first hinge axis,
wherein the first blade is configured to rotate about the first hinge axis,
wherein the second root is connected to the second blade at a second hinged connection defining a second hinge axis, and
wherein the second blade is configured to rotate about the second hinge axis.

15. The propulsion unit of claim 6, wherein the propeller further comprises a third blade pivotably joined to the hub by a third root,
   wherein the third root is configured to travel about the shaft axis between a fourth perimetric position on the external surface of the hub and a fifth perimetric position on the external surface of the hub, and
   wherein each of the fifth perimetric position, the third perimetric position and the second perimetric position is in a common plane with the shaft axis.

16. The propulsion unit of claim 6,
wherein the first blade is formed from at least one material,
wherein the second blade is formed from the at least one material, and
wherein the at least one material is at least one of:
carbon fiber;
graphite;
machined aluminum;
titanium;
fiberglass;
wood; or
plastic.

17. A method to operate an aerial vehicle comprising:
initiating an operation of a motor having a propeller coupled thereto at a first time,
   wherein the propeller comprises a hub, a first blade and a second blade,
   wherein the hub is coupled to a shaft of the motor,
   wherein the first blade is pivotably joined to the hub by a first root,
   wherein the first root is configured to travel between a first perimetric position on an external surface of the hub and a second perimetric position on the external surface of the hub,
   wherein the second blade is joined to the hub by a second root, and
   wherein the second root is fixed to the hub at a third perimetric position; and
stopping the operation of the motor at a second time,
   wherein the first root is urged to the first perimetric position during the operation of the motor, and
   wherein the first root is urged to the second perimetric position after the operation of the motor is stopped.

18. The method of claim 17, wherein the motor is mounted to a frame of an aerial vehicle having a forward orientation, and
   wherein the motor is mounted to the frame at a positive angle with respect to a normal to the forward orientation of the aerial vehicle.

19. The method of claim 17, wherein each of the second perimetric position and the third perimetric position is in a common plane with a shaft axis.

20. The method of claim 17, wherein the first root is connected to the first blade at a first hinged connection defining a first hinge axis,
   wherein the first blade is configured to rotate about the first hinge axis,
   wherein the second root is connected to the second blade at a second hinged connection defining a second hinge axis, and
   wherein the second blade is configured to rotate about the second hinge axis.

21. The unmanned aerial vehicle of claim 1, wherein the first blade and the second blade are coaligned when the first root is disposed in the second perimetric position.

* * * * *